United States Patent
Shah et al.

(10) Patent No.: US 11,093,241 B2
(45) Date of Patent: Aug. 17, 2021

(54) OUTLIER SOFTWARE COMPONENT REMEDIATION

(71) Applicant: Red Hat, Inc., Raleigh, NC (US)

(72) Inventors: Aagam Birenbhai Shah, Ahmedabad (IN); Mitesh Vinodbhai Patel, Bengaluru (IN)

(73) Assignee: Red Hat, Inc., Raleigh, NC (US)

( * ) Notice: Subject to any disclaimer, the term of this patent is extended or adjusted under 35 U.S.C. 154(b) by 186 days.

(21) Appl. No.: 16/152,946

(22) Filed: Oct. 5, 2018

(65) Prior Publication Data

US 2020/0110601 A1    Apr. 9, 2020

(51) Int. Cl.
  *G06F 8/75* (2018.01)
  *G06F 8/77* (2018.01)
  *G06F 11/36* (2006.01)

(52) U.S. Cl.
  CPC .............. *G06F 8/75* (2013.01); *G06F 8/77* (2013.01); *G06F 11/362* (2013.01)

(58) Field of Classification Search
  CPC ............ G06F 8/75; G06F 8/77; G06F 11/362
  See application file for complete search history.

(56) References Cited

U.S. PATENT DOCUMENTS

| | | | | |
|---|---|---|---|---|
| 6,535,894 B1* | 3/2003 | Schmidt | ................. | G06F 8/658 |
| 8,117,596 B2* | 2/2012 | Thorley | ................... | G06F 8/71 717/120 |
| 8,165,998 B2* | 4/2012 | Semerdzhiev | .......... | G06F 16/10 707/690 |
| 8,229,906 B2* | 7/2012 | Semerdzhiev | .......... | G06F 16/10 707/696 |
| 9,304,980 B1* | 4/2016 | Hartsook | .............. | G06F 40/197 |
| 9,471,285 B1* | 10/2016 | Koohgoli | ................. | G06F 8/75 |
| 9,477,703 B1* | 10/2016 | Criss | ..................... | G06F 40/197 |
| 9,830,148 B1* | 11/2017 | Mo | .......................... | G06F 8/71 |
| 9,870,213 B2* | 1/2018 | Balachandran | ......... | G06F 8/658 |
| 10,042,626 B2* | 8/2018 | Nekrestyanov | ........... | G06F 8/65 |
| 10,423,594 B2* | 9/2019 | Olivier | ...................... | G06F 8/71 |
| 2004/0078688 A1* | 4/2004 | Pouyollon | ............. | G06F 11/362 714/38.14 |

(Continued)

OTHER PUBLICATIONS

Collective Intelligence for Smarter API Recommendations in Python by Renika D'Souza, Di Yang, and Cristina V. Lopes, University of California, Irvine; 2016; retrieved Aug. 28, 2018; https://arxiv.org/pdf/1608.08736.pdf; 10 pages.

(Continued)

*Primary Examiner* — Douglas M Slachta
(74) *Attorney, Agent, or Firm* — K&L Gates LLP

(57) ABSTRACT

Outlier software component remediation is disclosed. For example, a dependency evaluation module executes on a processor to determine an input stack including references to a first plurality of components incorporated in the program and a plurality of metadata tags associated with the first plurality of components. A plurality of selection filters is applied to the plurality of reference project manifests to select a reference project manifest as a reference stack. The first plurality of components identified in the input stack is compared with a second plurality of components identified in the reference stack. A component in the input stack is selected as an outlier component based on the reference stack lacking a reference to the component.

19 Claims, 11 Drawing Sheets

(56) References Cited

U.S. PATENT DOCUMENTS

| | | | |
|---|---|---|---|
| 2005/0055686 A1* | 3/2005 | Buban | G06F 8/62 |
| | | | 717/170 |
| 2009/0070374 A1* | 3/2009 | Eker | G06F 8/658 |
| 2010/0274755 A1* | 10/2010 | Stewart | G06F 8/75 |
| | | | 706/54 |
| 2011/0191747 A1* | 8/2011 | Charisius | G06F 8/20 |
| | | | 717/103 |
| 2013/0080997 A1* | 3/2013 | Dattathreya | G06F 8/71 |
| | | | 717/121 |
| 2013/0275943 A1* | 10/2013 | Namjoshi | G06F 8/75 |
| | | | 717/122 |
| 2014/0149435 A1* | 5/2014 | Sisman | G06F 11/362 |
| | | | 707/751 |
| 2015/0106810 A1* | 4/2015 | Ciano | G06F 9/45558 |
| | | | 718/1 |
| 2015/0363294 A1* | 12/2015 | Carback, III | G06F 8/37 |
| | | | 717/132 |
| 2016/0350202 A1* | 12/2016 | Zhou | G06F 11/362 |
| 2017/0111166 A1* | 4/2017 | Zheng | G06F 8/658 |
| 2017/0132545 A1* | 5/2017 | Michaely | G06F 11/362 |
| 2019/0079734 A1* | 3/2019 | Kadam | G06F 8/30 |
| 2019/0187973 A1* | 6/2019 | Weigert | G06F 8/72 |

OTHER PUBLICATIONS

Automated Library Recommendation by Ferdian Thung, David Lo, and Julia Lawall, Singapore Management University; 2013; retrieved Aug. 28, 2018; https://ieeexplore.ieee.org/document/6671293; 10 pages.

* cited by examiner

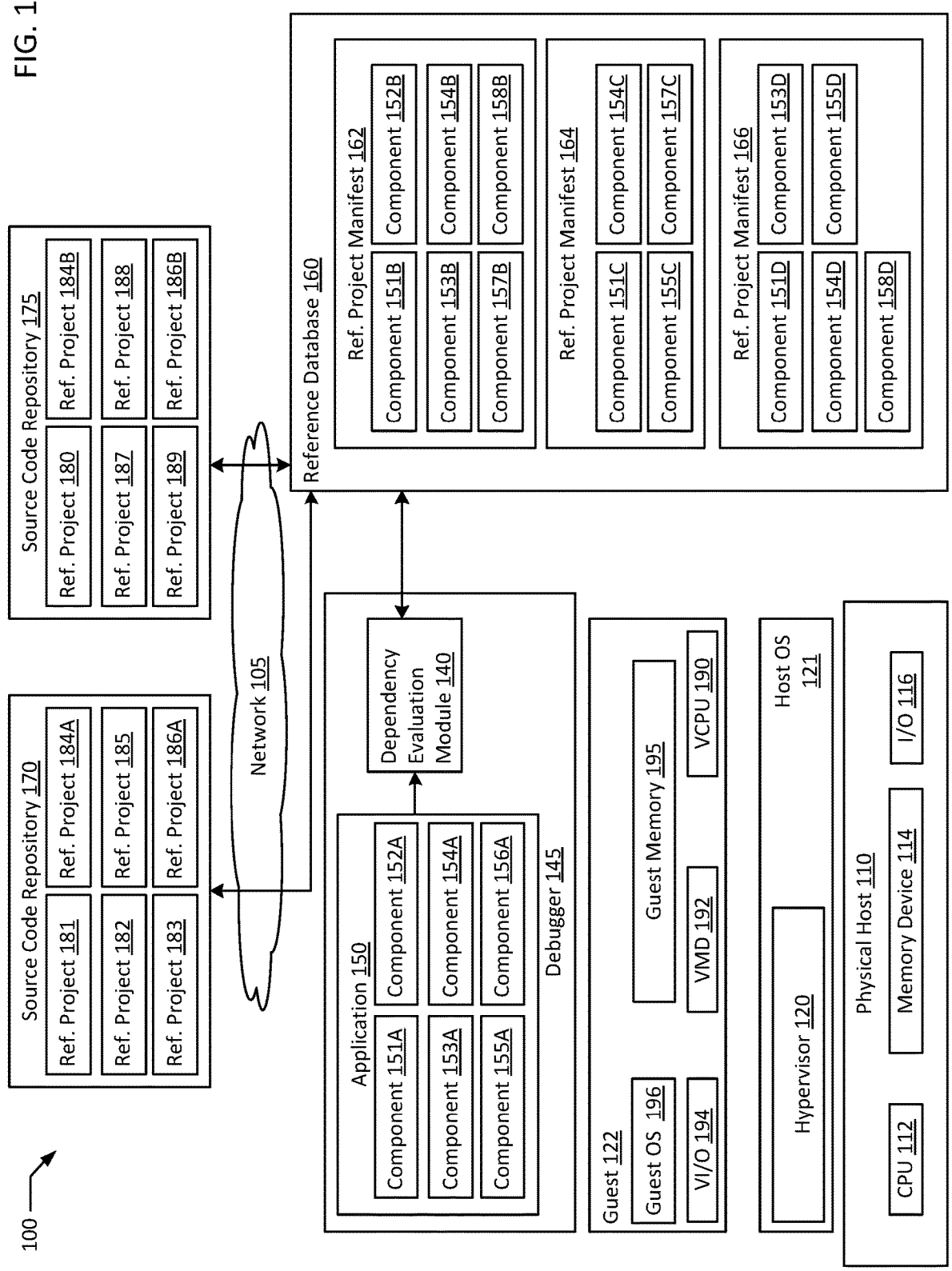

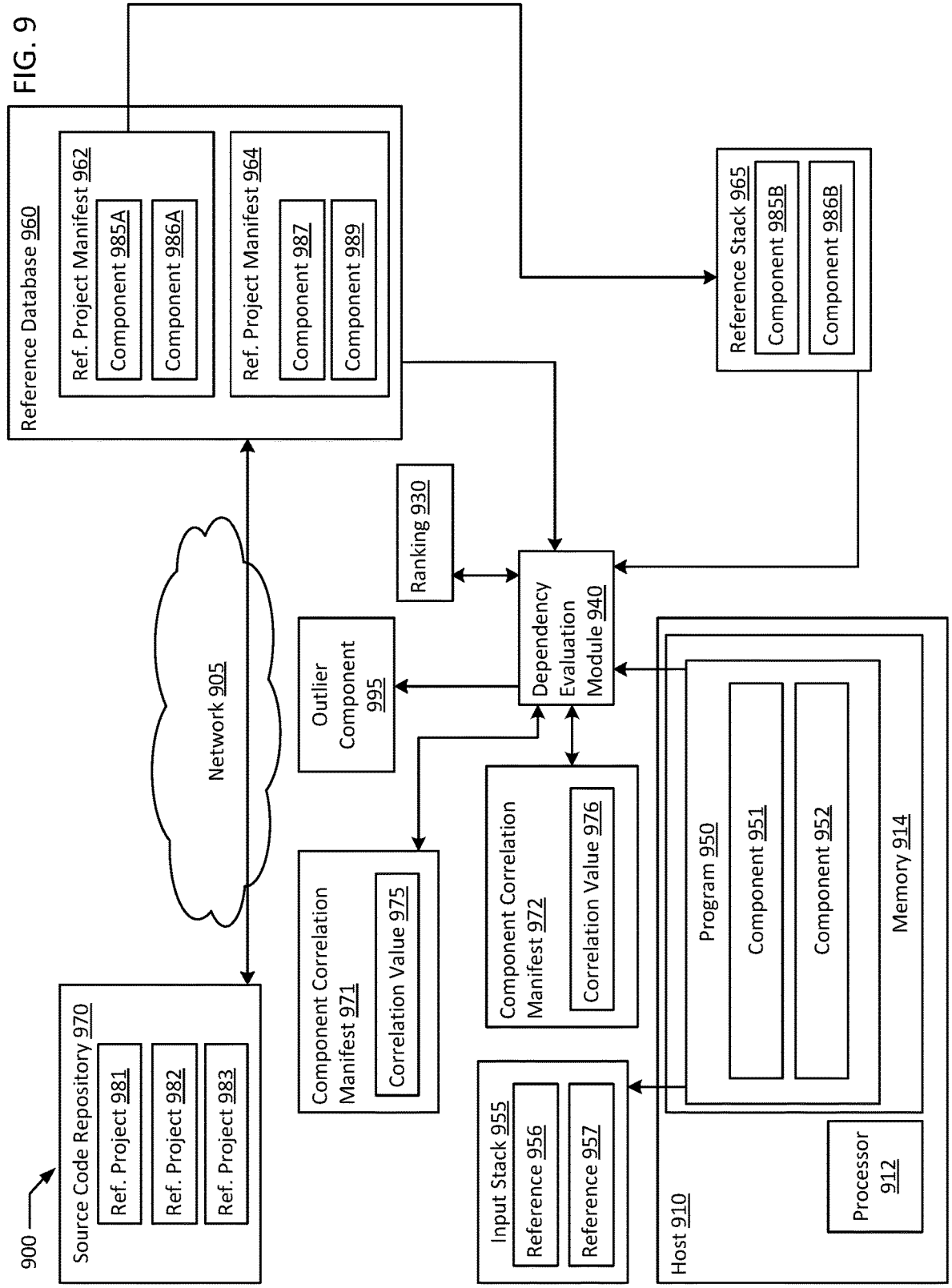

OUTLIER SOFTWARE COMPONENT REMEDIATION

BACKGROUND

The present disclosure generally relates to developing and executing computer programs in computer systems. For rapid development and deployment of software, developers may often seek to integrate existing code modules into new software programs. Therefore, software programs are often dependent on multiple integrated pre-existing software components. Many software programs are also subject to fluctuations in usage demands, requiring more instances during peak usage. To address fluctuating usage demands while maximizing the utilization of physical hardware, many computer systems employ virtualized guests such as virtual machines and containers to execute computing tasks performed by the computing systems, such as for hosting software programs. Typically, guests such as containers and virtual machines may be launched to provide extra compute capacity of a type that the guest is designed to provide, while isolating compute resources used by different users and tenants away from those of other users. Employing guests enables rapid scaling of applications to the volume of traffic requesting the services provided by those applications. In addition, guests typically allow for increased deployment flexibility since guests may typically be deployed in a variety of hardware environments. Multiple guests may also be clustered together to perform more complex functions than the respective guests are capable of performing individually. For software applications intended to be deployed in virtualized environments, development, debugging, and/or testing of those software programs may be conducted in similar virtualized environments to mimic the environments where the software programs will execute.

SUMMARY

The present disclosure provides a new and innovative system, methods and apparatus for outlier software component remediation. In an example, a dependency evaluation module executes on a processor to determine an input stack including references to a first plurality of components incorporated in the program. A plurality of metadata tags associated with the first plurality of components is determined. A plurality of selection filters is applied to the plurality of reference project manifests to select a reference project manifest as a reference stack. The first plurality of components identified in the input stack is compared with a second plurality of components identified in the reference stack. A component in the input stack is selected as an outlier component based on the reference stack lacking a reference to the component.

Additional features and advantages of the disclosed method and apparatus are described in, and will be apparent from, the following Detailed Description and the Figures.

BRIEF DESCRIPTION OF THE FIGURES

FIG. 1 is a block diagram of a system for outlier software component remediation according to an example of the present disclosure.

FIG. 9 is a block diagram of an example system implementing outlier software component selection according to an example of the present disclosure.

DETAILED DESCRIPTION OF EXAMPLE EMBODIMENTS

Figure 2A:
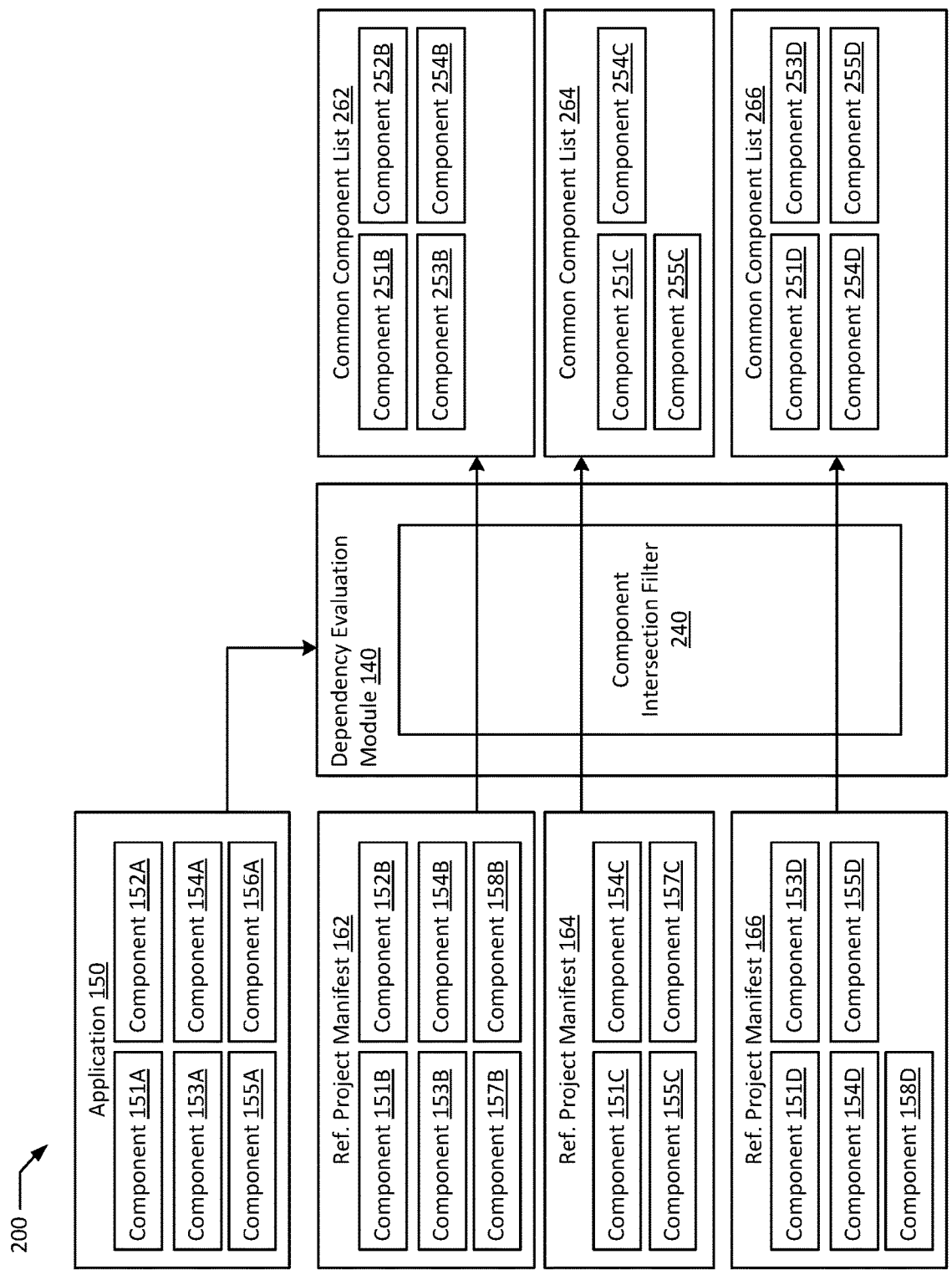
FIGS. 2A-D are block diagrams of a system performing outlier software component filtering according to an example of the present disclosure.

In many computer systems, physical hardware may host guests such as virtual machines and/or containers. In an example, a virtual machine ("VM") may be a robust simulation of an actual physical computer system utilizing a hypervisor to allocate physical resources to the virtual machine. In sharing physical computing resources, guests and/or a hypervisor controlling them, may also have access to shared components of the underlying host, for example, I/O devices (e.g., network interface cards ("NICs"), storage controllers, USB controllers, PS2 interfaces, etc.). Such access is typically restricted through a virtualization manager such as a hypervisor to ensure that virtual environments remain segregated and to prevent unauthorized access to other virtual environments on the same host, or to the host itself. In some examples, a container based virtualization system, for example, one managed by a container manager such as Red Hat® OpenShift® executing a containerization runtime environment such as Docker® may be implemented. Typically, a container will be hosted on a physical host or virtual machine that already has an operating system executing, and the container may be hosted on the operating system of the physical host or VM without executing an independent operating system of its own. Containers may be advantageous by being typically faster to deploy than virtual machines with independent operating systems and by typically incurring less computing overhead to execute than full virtual machines.

Software applications developed in a variety of programming languages are executed on physical hosts or virtual hosts (e.g., VMs and containers). Instead of redeveloping functionality of existing software programs, programmers typically seek to integrate new programs with these existing programs to utilize the features of the existing programs. However, to integrate program functionality piecemeal, elevated access to the source program may be required, for example, access to the source program's source code. Therefore, entire modules of existing code are typically integrated into new programs together (e.g., through the integration of shared libraries). Many online repositories of such modules for integration exist, however, without careful vetting of individual modules, potentially requiring access and understanding of the underlying source code of the module itself, it is often difficult to distinguish between high quality modules regularly updated for efficiency and security, and low quality modules that perform inefficiently and/or introduce security risks. Doing such investigations may significantly erode the advantages of using existing code modules rather than redeveloping certain functionality.

Typically, programs are designed to interoperate with other programs. Sharing incorporated modules (e.g., libraries) with related programs is often advantageous in ensuring interoperability. However, it is difficult at design time to necessarily ascertain the universe of past, present, and future applications that may interface with a program currently under development. A developer may select a library to incorporate into their application based on a written description of the library's features, without necessarily having investigated the actual implementation of the features in the library. That library may be perfectly satisfactory for the developer's intended functional purposes in the program being build. However, even a library that is currently state of the art, without being updated, could soon become antiquated or even ready for deprecation in fast moving technology fields. Therefore maintaining the modules incorporated into a given program as continually suitable for the program over the course of time as the program and its dependent incorporated modules (e.g., libraries) go through iterative releases is a significant task in an application development cycle.

The present disclosure simplifies integrated software component remediation by detecting modules incorporated into a software program that may be outliers for replacement through enabling a debugger to dynamically and automatically analyze the modules incorporated into the software program to identify comparable program projects represented in a reference database with similar designed functionality. The debugger may then analyze the identified comparable program projects to determine whether any of the modules incorporated into the software program are disused and/or identified as inefficient or unsecure, and therefore recommended for elimination and/or replacement. In an example, a reference database may be constructed by retrieving metadata manifests of the modules incorporated into software source code projects available to the maintainer of the reference database, for example, projects published in a public source code repository (e.g., GitHub®), or projects stored in a proprietary source code management system. Correlation of functionality between a software program and the reference manifests in the reference database may be drawn based on shared incorporated modules. By applying multiple filters, a preferred candidate is identified as the reference manifest against which the software program's modules are compared. Differences in incorporated modules may be selected, with additional filters applied (e.g., frequency of use) to determine outlier module candidates. Analysis may be performed on the source code of the software program to determine whether the identified outlier modules are utilized in the source code, allowing the module to be removed if it is unused. Alternatively, if the module is referenced in the source code, an alternative module (e.g., a more updated module) may be identified as offering similar replacement functionality to replace the selected outlier module that may soon be deprecated, or is already deprecated. In an example, outlier software component selection enables automated detection and remediation of unnecessarily included software modules. In addition, outlier software component selection allows for higher security in new and updated applications by ensuring that up to date (and therefore most likely security patched) components are integrated into the software program. Incorporating higher quality and more updated modules may typically improve processing efficiency for the host node on which the program executes, resulting in more instances of the software program potentially being able to execute on the same hardware environment, thereby increasing hardware utilization and reducing idle time.

FIG. 1 is a block diagram of a system for outlier software component remediation according to an example of the present disclosure. The system 100 may include one or more physical host(s) 110. Physical host 110 may in turn include one or more physical processor(s) (e.g., CPU 112) communicatively coupled to memory device(s) (e.g., MD 114) and input/output device(s) (e.g., I/O 116). As used herein, physical processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device 114 refers to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data. For example, a network interface card may be an example of an I/O device through which physical host 110 and guests (e.g., guest 122) hosted on physical host 110 communicates with external systems over a network. CPU(s) 112 may be interconnected using a variety of techniques, ranging from a point-to-point processor interconnect, to a system area network, such as an Ethernet-based network. Local connections within physical host 110, including the connections between processor 112 and a memory device 114 and between processor 112 and I/O device 116 may be provided by one or more local buses of suitable architecture, for example, peripheral component interconnect (PCI).

In an example, physical host 110 may host one or more guests (e.g., guest 122). In an example guests may be VMs and/or containers, which may additionally host additional nested layers of guests (e.g., where application 150 hosted on guest 122 is another guest). For example, application 150 may be another virtual guest nested inside of a virtual machine or container guest 122. In an example, a container as referred to herein may be implemented with any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, guest 122 may execute on physical host 110 (e.g., on host OS 121 of physical host 110). In an example, guest 122 may execute on a virtual host (e.g., a VM) executing on physical host 110. In addition, containers and/or VMs may further host other guests necessary to execute their configured roles (e.g., a nested hypervisor or nested containers). In an example, a guest (e.g., guest 122) further host additional guests such as a Java® Virtual Machine ("JVM"), for example, if execution of Java® code is necessary.

System 100 may run a software layer (e.g., hypervisor 120) above the hardware and below the guests (e.g., guest 122), as schematically shown in FIG. 1. In an example, the hypervisor 120 may be a component of host operating system 121, which executes on physical host 110. In another example, the hypervisor 120 may be provided by an application running on host operating system 121. In an example, hypervisor 120 may run directly on physical host 110 without an operating system beneath hypervisor 120. Hypervisor 120 may virtualize the physical layer, including processors, memory, and I/O devices, and present this virtualization to guests (e.g., guest 122) as devices, including virtual central processing unit ("VCPU") 190, virtual memory devices ("VIVID") 192, virtual input/output ("VI/O") device 194, and/or guest memory 195. Processor virtualization may be implemented by the hypervisor 120 scheduling time slots on physical processors 112 such that from the guest operating system's perspective those time slots are scheduled on a virtual processor 190.

Guest 122 may run on any type of dependent, independent, compatible, and/or incompatible applications on the underlying hardware and host operating system 121. In an example, application 150 running on guest 122 may be dependent on the underlying hardware and/or host operating system 121. In another example, application 150 running on guest 122 may be independent of the underlying hardware and/or host operating system 121. In an example, application 150 running on guest 122 may be compatible with the underlying hardware and/or host operating system 121. Additionally, application 150 running on guest 122 may be incompatible with the underlying hardware and/or OS. The hypervisor 120 may manage memory for the host operating system 121 as well as memory allocated to guest 122 and guest operating system 196 such as guest memory 195 provided to guest OS 196. In an example, guest 122 may execute on host OS 121, and may be dependent on host OS 121 for memory and/or processor management. In an example, code executing on guest 122 may be required to be compatible with guest OS 196 but not with host OS 121. In an example, any form of suitable network for enabling communications between computing devices, for example, a public network (e.g., the Internet), a private network (e.g., a local area network (LAN) or wide area network (WAN)), or a combination thereof may be employed to connect physical host 110 and/or guest 122 to other computer systems.

In an example, application 150 may execute on guest 122 (e.g., inside of a debugger 145), where application 150 is dependent on some of the features of components 151A, 152A, 153A, 154A, 155A, and 156A. For example, components 151A-156A may be shared libraries integrated into application 150 to provide certain functionalities (e.g., networking protocols, structured input/output file format parsing, database SQL integrations, etc.). A debugger 145 generally refers to a debugging tool that supports the debugging of a particular set of programming languages. In an example, application 150 may be executing in a debugger 145, which may include a dependency evaluation module 140. In other examples, application 150 and/or dependency evaluation module 140 may execute outside of debugger 145, with debugger 145 configured to receive the inputs and outputs of application 150 and/or dependency evaluation module 140. For example, if a timeout occurs during the debugging of application 150, the debugger 145 may identify an error in the execution of application 150. In an example, communications among physical host 110, guest 122, and other network nodes, devices, and programs may be routed through the debugger 145. In an example embodiment, the debugger 145 may be able to debug one or more programming languages (e.g., C, C-sharp, jBPM, Visual Basic, SQL, Pascal, COBOL, etc.). In an example, debugger 145 and/or dependency evaluation module 140 may be implemented in any suitable programming language.

In an example, network 105 may be any form of suitable network for allowing communications between computing devices, for example, a public network (e.g., the Internet), a private network (e.g., a local area network (LAN) or wide area network (WAN)), or a combination thereof. In some examples, the dependency evaluation module 140 is associated with a reference database 160 implemented in any suitable type of database, for example, a relational database. The reference database 160 may be associated with a database management system (DBMS). A DBMS is a software application that facilitates interaction between the database and other components of the nodes 110A-C. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, the reference database 160 may be organized as a formal database with a schema such as a relational schema with defined tables, indices, links, triggers, various commands etc. In some examples, the storage component of reference database 160 may not be organized as a formal database, but may instead be an alternative storage structure capable of holding the information and being queried in relation to reference project manifests (e.g., reference project manifests 162, 164, and 166) and their respective associated components (e.g., components 151B, 152B, 153B, 154B, 157B, 158B, 151C, 154C, 155C, 157C, 151D, 153D, 154D, 155D, 158D) in system 100, including but not limited to a file, folder, directory, registry, etc. In some examples, the microservice registry 160 may reside over a network (not depicted), which may be, for example, a public network (e.g., the Internet), a private network (e.g., a local area network (LAN) or wide area network (WAN)), or a combination thereof. In an example, rather than storing the entirety of components associated with reference project manifests 162, 164, and 166, reference database 160 may store a limited amount of metadata (e.g., name, hash value, checksum, modification date, etc.) representing each of components 151B, 152B, 153B, 154B, 157B, 158B, 151C, 154C, 155C, 157C, 151D, 153D, 154D, 155D, 158D for remediation purposes.

In an example, reference database 160 is populated from one or more source code repositories (e.g., source code repositories 170, 175) located across network 105 from reference database 160. In the example, source code repository 170 may be a public database of open source software projects (e.g., GitHub®), while source code repository 175 may be a private source code repository operated by the same entity implementing reference database 160 implemented with any suitable version control system (e.g., Subversion®, Concurrent Versions System®, Microsoft® Visual SourceSafe®, etc.). In an example, source code projects (e.g., reference projects) may be public and/or proprietary source code projects. In the example, reference database 160 is configured to retrieve metadata associated with reference projects 180, 181, 182, 183, 184A-B, 185, 186A-B, 187, 188, and 189 and their associated integrated components. For example, a set of selection criteria may be implemented for project selection. In the example, reference projects 184A and 186A may be copies of reference projects 184B and 186B, and the presence of reference projects 184A-B and 186A-B may be a selection criteria for inclusion (e.g., based on a project being located in multiple trusted source code repositories).

In the example, metadata reference project manifest 164 is created with component references (e.g., components 151C, 154C, 155C, and 157C) corresponding to the components of reference projects 184A-B. In an example, only the metadata references to each component are retrieved, for example, to save storage space. In an example, reference project manifest 164 is a metadata file retrieved from source code repository 160. In another example, reference project manifest 164 is a custom metadata file generated in reference database 160 based on individual elements retrieved from source code repository 160, potentially with additional modifications, for example, to conform reference project manifests retrieved from different source code repositories (e.g., source code repositories 170 and 175) to a common standard and schema to allow more efficient queries. In an example, reference project manifest 164 is constructed with a custom schema that may be indexed in reference database 160 for efficient querying. In some examples, a copy of components 151C, 154C, 155C, and 157C may also be retrieved and stored either in reference database 160, or in a separate component database (e.g., so the components may be readily added to a project under development in conjunction with debugger 145). In an example, reference project manifest 166 corresponds to reference projects 186A-B. In an example, reference project manifest 162 corresponds to reference project 182, which may be selected for inclusion in reference database 160 for a variety of reasons. For example, selection criteria may include access rate metrics, download metrics, quality voting metrics, recommendation metrics, and/or integration metrics (e.g., how often a project is linked/integrated to other projects) stored by source code repository 170 that are queried by reference database 160. In an example, highly rated, often cited projects are likely to be kept up to date, including their respective integrated components, and therefore they often serve as reference projects that may be advantageously used to determine a current state of the art set of modules for integration.

FIGS. 2A-D are block diagrams of a system performing outlier software component filtering according to an example of the present disclosure. Example system 200 depicted in FIG. 2A depicts an application 150 with integrated components 151A, 152A, 153A, 154A, 155A, and 156A being input into dependency evaluation module 140 for dependent module analysis. In the example, a first filter is applied by dependency evaluation module 140 (e.g., component intersection filter 240). In the example, component intersection filter 240 retrieves each reference project manifest (e.g., reference project manifests 162, 164, and 166) in reference database 160, and finds the intersections between the components referenced by each of reference project manifests 162, 164, and 166 and application 150 generating common component lists 262, 264, and 266. In an example, common component list 262 corresponding to reference project manifest 162 indicates that four components are shared between application 150 and reference project manifest 162 (e.g., component 251B corresponding with components 151A-B, component 252B corresponding with components 152A-B, component 253B corresponding with components 153A-B, and component 254B corresponding with components 154A-B). Similarly, common component list 264 (e.g., components 251C, 254C, and 255C), and common component list 266 (e.g., component 251D, 253D, 254D, and 255D) are generated corresponding to reference project manifests 164 and 166 respectively. In the example, because common component lists 262 and 266 each have four shared components with application 150, while common component list 264 only has three shared components, reference project manifest 164 is eliminated from contention as a reference stack for analyzing application 150's integrated components 151A-156A as being outliers. In an example, a quantity of shared components may be indicative of a likelihood of common configured purpose between application 150 and reference projects 182 and 186A-B. In some examples, a shared size of components may additionally be factored in rather than relying on counts (e.g., a large shared component may provide ten times as many common features as a small shared component). In an example, sharing a networking protocol library (e.g., component 151A, 151B, 151D) may be indicative of a shared status as network accessible applications. The set of integrated modules in an application may be referred to as a component stack of the application. In an example, a machine learning model with a web API (e.g., application 150) may have a stack with libraries such as {"Deeplearning4j", "Vertx-core", "Vertx-web", etc.}. An alternative stack for a similar program (e.g., a reference stack from reference database 160) may be {"Weka", "Vertx-core", "Vertx-web", etc.}.

Figure 2B:
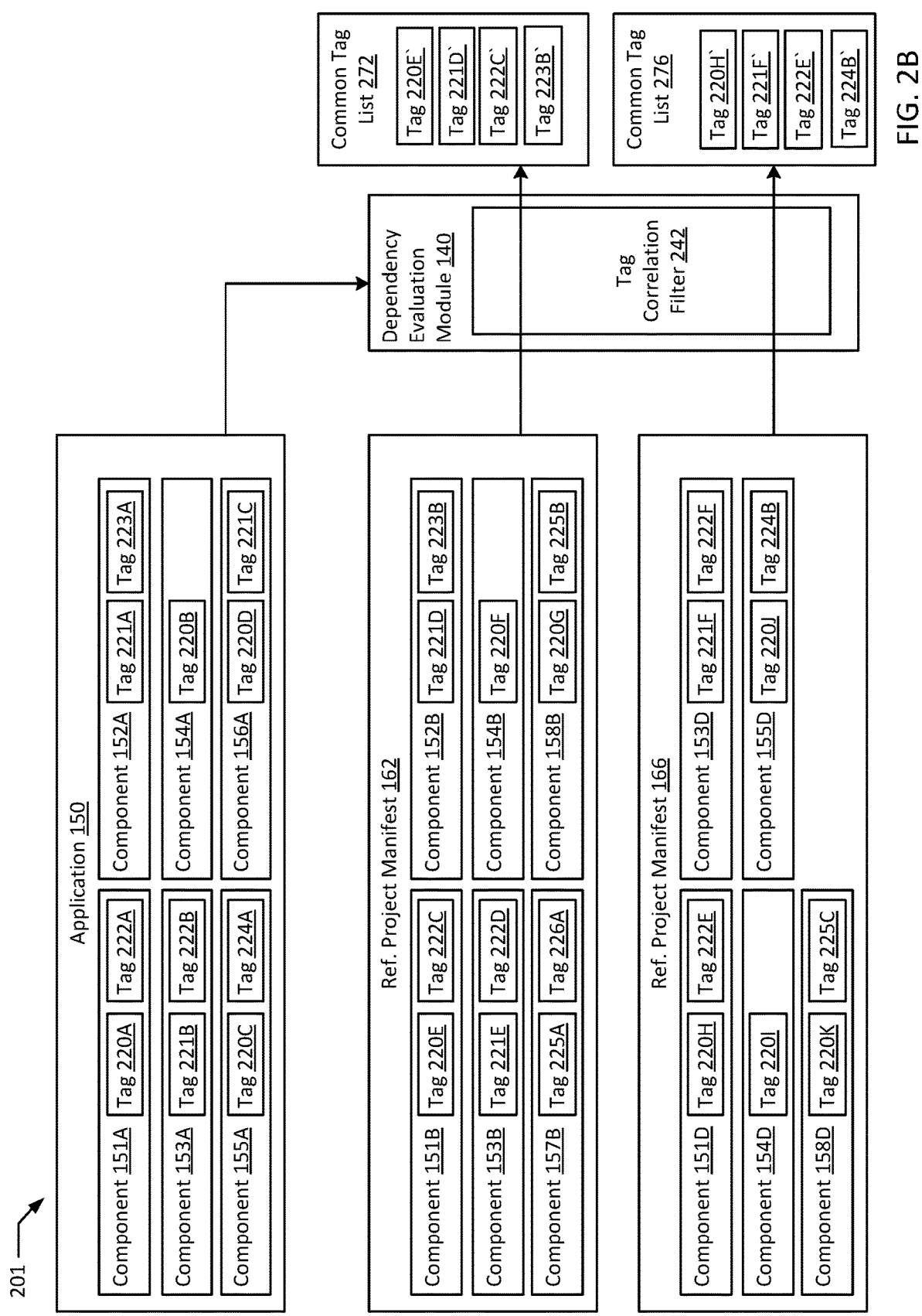

Example system 201 depicted in FIG. 2B shows a second filter being applied to the results of the first filter in example system 200. For example, reference project manifests 162 and 166 which have not been eliminated by the component intersection filter 240 may be entered into a tag correlation filter 242. In an example, various components and/or reference projects may be tagged with a functional purpose. In an example, each group of tags 220A-J, 221A-F, 222A-F, 223A-B, 224A-B, 225A-C, and 226A corresponds to a respective descriptor for a component (e.g., component 151A, 151B, 151D; 152A, 152B; 153A, 153B, 153D; 154 A, 154B, 154D; 155A, 155D; 156A; 157B; and 158B, 158D) associated with the respective tags. For example, in the case of the networking protocol library (e.g., component 151A, 151B, 151D), tag 220A, E, H may represent "networking" and tag 222A, C, E may represent "encryption". In the machine learning web API example, "Deeplearning4j" and "Weka" may both be tagged with [machine learning] and [deep learning], "Vertx-core" may be tagged with [vertx], [web], and [core], while "Vertx-web" may be tagged with [vertx], and [web]. In an example, tag correlation filter 242 compares each of the different tags represented in the components of application 150, with each of the respective different tags represented in reference project manifests 162 and 166 to generate common tag lists 272 and 276. In an example, only unique tags are considered, so a list of unique tags for each of application 150 (e.g., tags 220A-D, 221A-C, 222A-B, 223A, 224A), reference project manifest 162 (e.g., tags 220E-G, 221D-E, 222C-D; 223B, 225A-B, 226A) and reference project manifest 166 (e.g., tags 220H-K, 221F, 222E-F, 224B, 225B-C) may first be generated. In an example, common tags between application 150 and reference project manifest 162 as represented by common tag list 272 include tags 220E', 221D', 222C', and 223B', in which case the notation ' denotes the first copy of a common tag encountered by dependency evaluation module 140. In an example, reference project manifest 166 shares four common tags (e.g., tags 220H', 221F', 222E', and 224B' in common tag list 276) with application 150 which is the same common tags shared between reference project manifest 162 and application 150. In the example, since the shared count of common tags is the same, neither reference project manifest 162 nor reference project manifest 166 is eliminated as a potential reference stack for application 150. In various examples, tags may be curated for greater matching efficiency (e.g., tags may be standardized to improve matches by avoiding typographical errors or different names for the same feature). In an example where common tag list 272 and common tag list 276 have different counts of shared tags, the reference project manifest with the higher count of shared tags is selected as a reference stack for application 150.

Figure 2C:
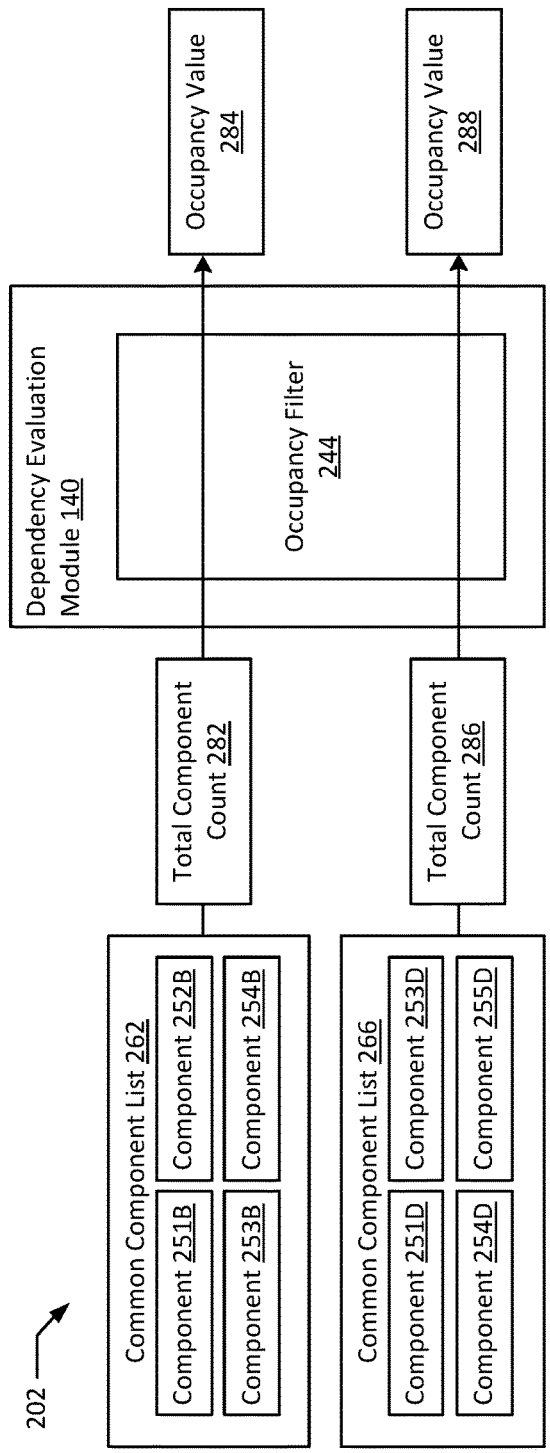

Example system 202 depicted in FIG. 2C illustrates a third filter (e.g., an occupancy filter 244) being applied to the previously generated common component lists 262 and 266 for each of the remaining reference stack candidates. In the example, common component list 264 (e.g., components 251C, 254C, and 255C), and common component list 266 (e.g., component 251D, 253D, 254D, and 255D) each contain four components shared between application 150 and reference project manifests 162 and 166 respectively. In an example, occupancy filter 244 takes common component lists 262 and 266 as inputs and compares them against total component count 282 (e.g., of reference project manifest 162) and total component count 286 (e.g., of reference project manifest 166) to calculate respective occupancy values of reference project manifests 162 and 166. In an example, an occupancy value is calculated based on a ratio of common components to total components, whether by size, count, or weighted otherwise (e.g., by rating, count of functions within a given component, etc.). In illustrated example system 202, occupancy value 284 is calculated based on four common components (e.g., components 251B, 252B, 253B, and 254B) out of six total components (e.g., components 251B, 252B, 253B, 254B, 257B, 258B) resulting in a formula of 4/6=2/3 or approximately 0.666. Similarly, occupancy value 288 is calculated based on four common components (e.g., components 251D, 252D, 253D, and 255D) out of five total components (e.g., components 251D, 252D, 253D, 255D, 258D) resulting in a formula of 4/5 or approximately 0.8. In the example, reference project manifest 166 is selected as a reference stack for application 150 based on occupancy value 288 being higher than occupancy value 284. In an example, instead of a count of components, an aggregate size of components may be implemented to calculate occupancy.

Figure 2D:
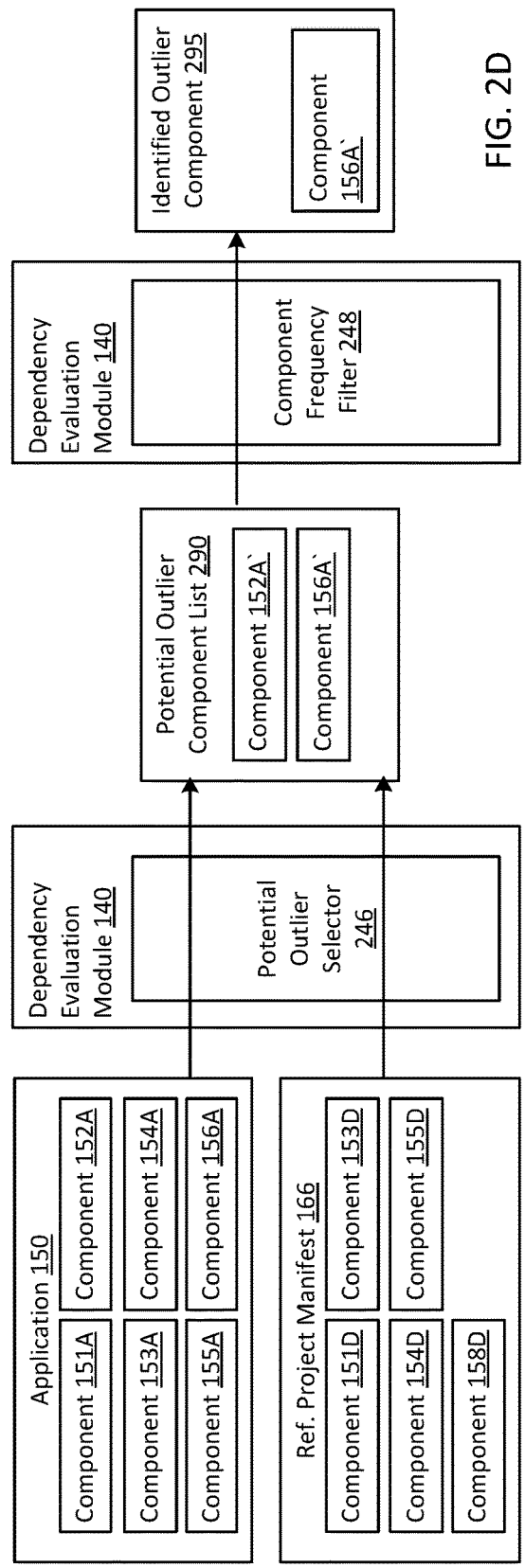

Illustrated system 203 depicted in FIG. 2D shows how a given component is selected as an outlier component in application 150 based on a comparison with selected the previously selected reference stack (e.g., reference project manifest 166). In an example, potential outlier selector 246 receives the component list (e.g., components 151A-156A) of application 160 as an input stack and the component list (e.g., components 151D, 153D, 154D, 155D, and 158D) of reference project manifest 166 as a reference stack. In the example, a potential outlier component list 290 is generated, including components 154A' (e.g., a reference to or copy of component 154A) and 156A' (e.g., a reference to or copy of component 156A) based on reference project manifest 166 lacking any reference to components corresponding to component 154A or 156A. In an example, potential outlier component list 290 is presented in its entirety as outlier modules for evaluation by debugger 145. In another example, potential outlier component list 290 is further submitted as an input into a component frequency filter 248 to select for a subset of outlier modules to be presented as outlier components. For example, component frequency filter 248 calculates the prevalence of each module among all reference project manifests (e.g., reference project manifests 162, 164, and 166) in reference database 160. In the example, the number of occurrences of each distinct module is tabulated and ranked. For example, component 151B, 151C, 151D=3 references; component 152B=1 reference; component 153B, 153D=2 references; component 154B, 154C, 154D=3 references; component 155C, 155D=2 references; component 156A=0 references; component 157B, 157C =2 references; component 158B, 158D=2 references. In example system 203, component 152A' (e.g., 1 references) is therefore more frequently included in the reference database 160, than component 156A' (e.g., 0 reference), and therefore component frequency filter 248 selects component 156A' as the identified outlier component 295 in application 150. In an example, remediation for outlier component 156A' may include identifying whether any function calls to component 156A are actually invoked in application 150 to determine whether incorporating component 156A may affect the functionality of application 150. In an example, an alternative module may be recommended to replace component 156A, for example, based on commonality of tags with tags 221A and/or 223A.

In various examples, applying component intersection filter 240, tag correlation filter 242, occupancy filter 244, component frequency filter 248 and/or other filters for selecting a reference stack for application 150 out of the reference project manifests in reference database 160 in various differentiated orders may be advantageous. For example, component frequency filter 248 may be applied as a second filter after the component intersection filter 240 to select those reference project manifests with high component intersection counts that also share highly (or lowly) used components. In an example, matching more rarely used components may be indicative of a better functional match, for example, the more rarely used components may be more likely correlated with a designed purpose of application 150, while more commonly used shared components may be indicative of popular modules incorporated in many different projects for generic purposes (e.g., networking protocols, XML libraries, database drivers, etc.). In such examples, matching low component frequency components may be a high value selection criterion for a reference stack. In an example, after each filter (e.g., component intersection filter 240, tag correlation filter 242, occupancy filter 244, component frequency filter 248, etc.) is applied, the remaining candidate reference project manifests that were not eliminated are retained as a temporary working set of reference project manifests, on which the next filter is applied until one reference project manifest remains as the selected reference stack for application 150.

Figure 3A:
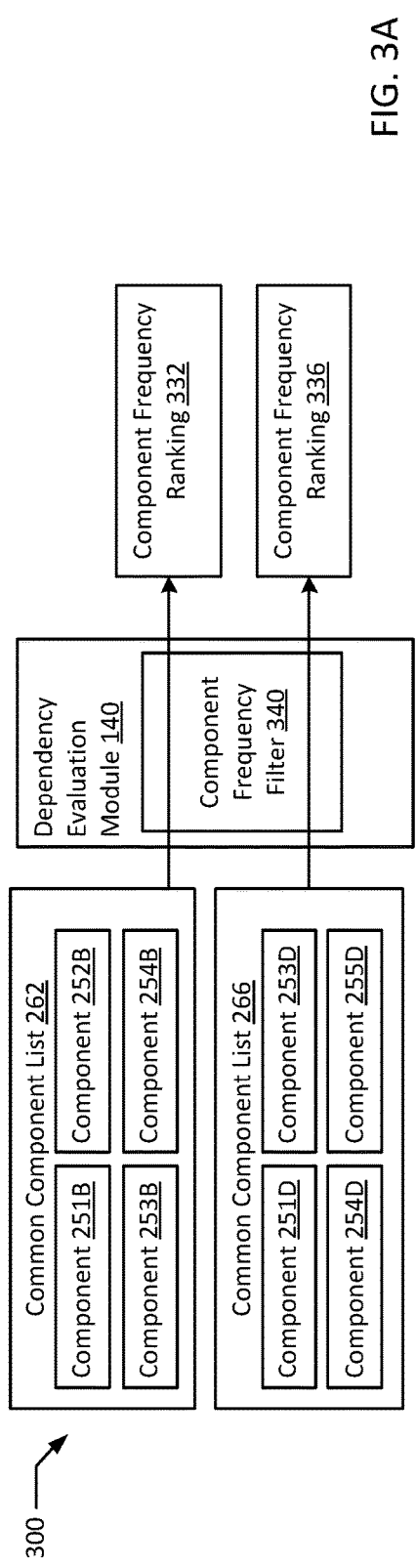
FIGS. 3A-B are block diagrams of a system performing outlier software component selection according to an example of the present disclosure.
Figure 3B:
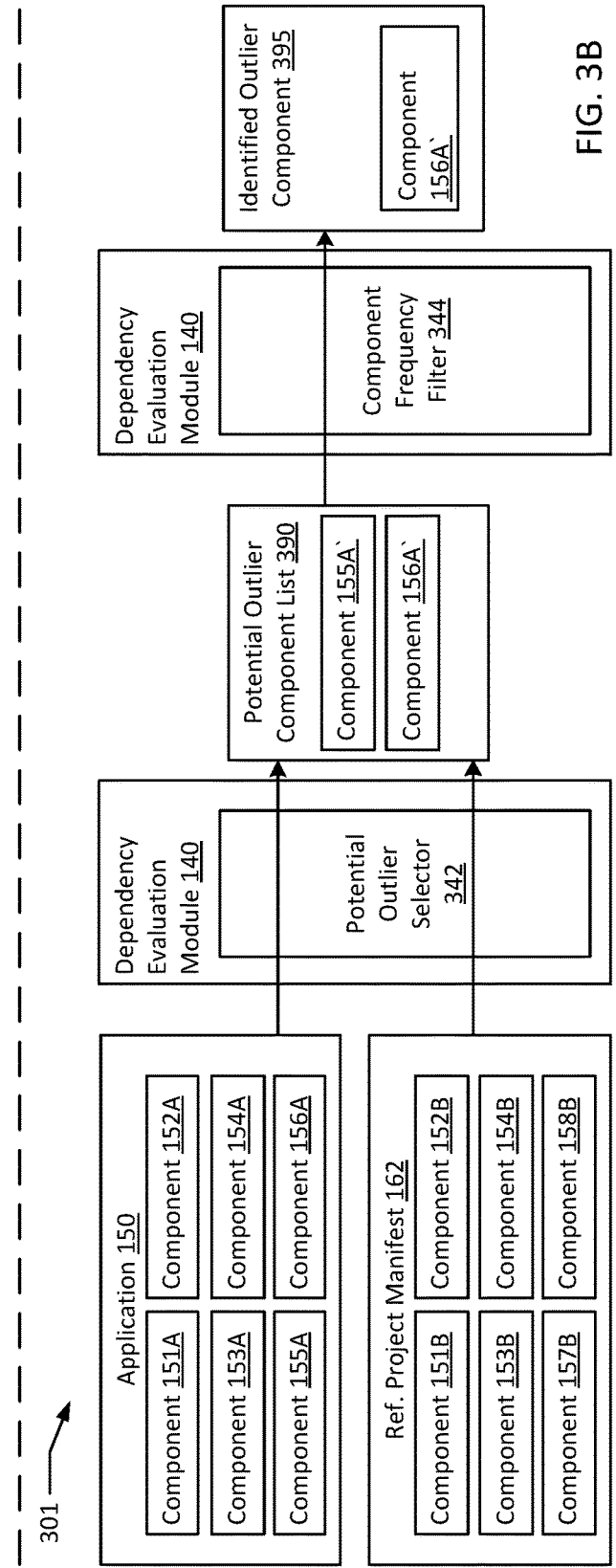

FIGS. 3A-B are block diagrams of a system performing outlier software component selection according to an example of the present disclosure. Example system 300 depicted in FIG. 3A is an alternative operation for selecting a reference stack for application 150, where instead of submitting the working set of reference project manifests 162 and 166 from system 200 to tag correlation filter 242 as depicted in system 201 on FIG. 2B, the working set of reference project manifests 162 and 166 is instead submitted into a component frequency filter 340. In the example, common component list 262 and common component list 266 have respective component frequency rankings 332 and 336 computed based on the relative frequency of occurrence of components 251B, 252B, 253B, 254B, 251D, 253D, 254D, and 255D in reference database 160. In the example, components 251B, 252B, 253B, 254B, 251D, 253D, 254D, and 255D are references to components 151B, C, D; 152B; 153B, D; 154B, C, D; 155C, D. In the example, component 151B, 151C, 151D=3 references; component 152B=1 reference; component 153B, 153D=2 references; component 154B, 154C, 154D=3 references; component 155C, 155D=2 references. In an example, because component 255D (e.g., referencing component 155C, D) appears twice in reference database 160 while component 252B (e.g., referencing component 152B) appears only once in reference database 160, reference project manifest 162 is selected as the closer match to application 150. For example, a configured function of application 150 may be machine learning, while application 150 is also a web server. In the example, component 252B (e.g., a reference to component 152A and 152B) may be a machine learning library that is less frequently incorporated than component 255B which may be a web service component used in many web services not necessarily having anything to do with machine learning. In such cases, perhaps counter-intuitively, a negative correlation between frequency and quality of reference stack match may be observed.

Example system 301 depicted in FIG. 3B shows the input stack of components 151A-156A of application 150 being submitted into potential outlier selector 342 along with reference project manifest 162. Potential outlier selector 342 outputs a list of components of application 160 that are not present in reference project manifest 162 (e.g., component 155A' representing to component 155A, and component 156A' representing component 156A). In the example, potential outlier component list 390 is sent into component frequency filter 344, which may be similar to component frequency filter 340, but configured with different frequency selection criteria. For example, component frequency filter 340 is configured to preferentially select for low frequency components to increase match quality, while component frequency filter 344 is configured to select for high frequency components to be eliminated as potential outliers. In the example, component 155A' is referenced twice in reference database 160, while component 156A' is not referenced in reference database 160, so component 156A' is selected as identified outlier component 395. In an example, different selection criteria identified the same outlier component 156A' in example system 203 and in example system 301. In some implementations, multiple combinations of automated outlier software component remediation tests may be executed on a given application 150, and the results of the various tests may be combined to obtain one or more consensus outlier software modules.

Figure 4:
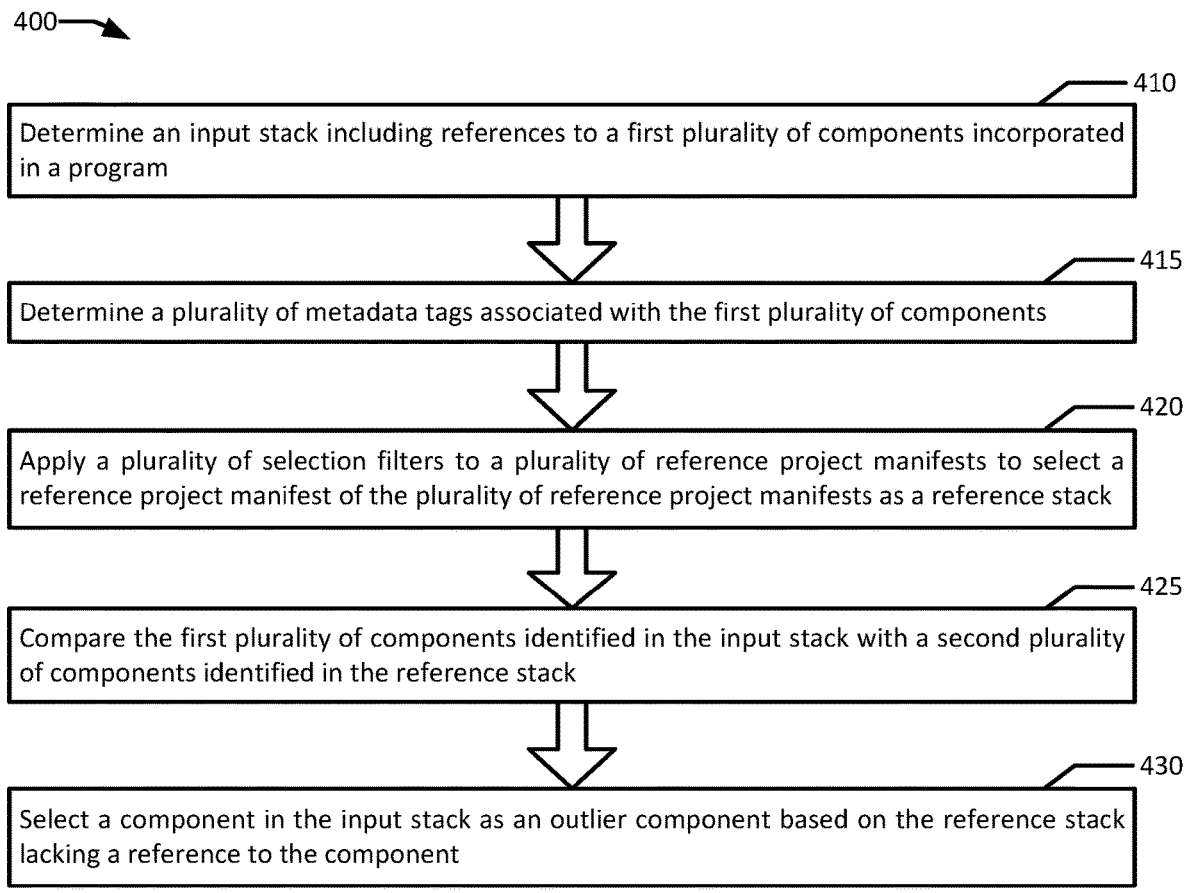
FIG. 4 is a flowchart illustrating an example of outlier software component filtering and outlier remediation according to an example of the present disclosure.

FIG. 4 is a flowchart illustrating an example of outlier software component filtering and outlier remediation according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by a dependency evaluation module 140.

Example method 400 may begin with determining an input stack including references to a first plurality of components incorporated in a program (block 410). For example, application 150 being debugged in debugger 145 may have application 150's list of incorporated modules (e.g., libraries) submitted to dependency evaluation module 140, which list of modules may be interpreted as an input stack of components 151A-156A incorporated in application 150. A plurality of metadata tags associated with the first plurality of components is determined (block 415). In an example, each component of components 151A-156A may be additionally associated with one or more tags (e.g., tags 220AD, 221AC, 222AB; 223A; 224A). In an example, the combination of the component manifest (e.g., references to components 151A-156A) of application 150 with the list of tags (e.g., tags 220AD; 221AC; 222A, B; 223A; 224A) associated with application 150 form a basis with which dependency evaluation module 140 assesses various reference project manifests for similarity in functionality with application 150. Tags may be automatically computed, for example, based on comments in the source code of various components, or based on recognized external calls (e.g., API calls) performed by the various components. Tags may also be manually attributed to a given component. In an example, when a given project is submitted to a source code repository, predetermined tags may be made available for labeling the project and/or its components (e.g., in a drop down menu) to ensure uniform tag naming for ease of search and matching.

A plurality of selection filters is applied to a plurality of reference project manifests to select a first reference project manifest of the plurality of reference project manifests as a reference stack (block 420). In an example, the plurality of reference project manifests is populated from a first source code repository storing a plurality of source code projects accessible over a network. For example, reference database 160 may be a selected subset of reference projects 181-189 from source code repositories 170 and 175. In an example, source code repositories 170 and/or 175 gather and maintain various metrics associated with each of reference projects 181-189 including incorporation metrics (e.g., how often a project is incorporated into or referenced by other projects), review metrics (e.g., commentary and/or ratings regarding the quality of a given project), code complexity metrics (e.g., calculated metrics relating to the human readability and understandability of a given project), supportability metrics (e.g., metrics relating to how well the source code of a project is documented and/or commented, and how likely a change in the code will result in unintended consequences), other code quality metrics (e.g., extensibility metrics for how difficult it would be to add new functionality to the project), and/or dead code metrics (e.g., deprecated code branches that can't be reached during execution that have not been removed from the code) that are evaluated by reference database 160 before a given reference project is incorporated into reference database 160 as a reference project manifest (e.g., reference project manifests 162, 164, 166). In some examples, projects from a public database (e.g., source code repository 170) may be graded more stringently than projects from a developer's own organization (e.g., source code repository 175). In an example, finding a match as a reference stack within the developer's own organization is more likely to result in a unity of functionality and design purpose. In addition, encouraging common module usage within an organization may improve the overall supportability of the organization's code base by ensuring that known issues may be resolved throughout the code base by updating individual dependencies rather than testing for whether a given issue exists in various competing integrated components, and then developing remedies for all of the various affected components.

In an example, a series of selection filters may be applied until one reference project manifest from reference database 160 is selected as a reference stack to which the input stack of application 150 is compared. For example, a combination of component intersection filter 240, tag correlation filter 242, occupancy filter 244, component frequency filter 248 and/or other filters may be applied for selecting a reference stack for application 150 out of the reference project manifests in reference database 160. In an example, after each filter is applied the remaining reference project manifests resulting from the filter are stored as a working set of reference project manifests that is updated after each subsequent filter is applied until only one reference project manifest remains (e.g., the reference stack). In an example, the component intersection filter 240 compares each of the plurality of reference project manifests (e.g., reference project manifests 162, 164, and 166) in reference database 160 (or those reference project manifests still remaining in a working set if the component intersection filter 240 is not the first filter applied) with the input stack of components (e.g., components 151A-156A) to select at least one selected reference project manifest with a highest count of shared components with components 151A-156A (e.g., reference project manifests 162 and 166 with four shared components a piece), and the working set of reference project manifests is updated with the selected reference project manifests 162 and 166. In an example, reference project manifests 162 and 166 become the inputs into the next selection filter.

In an example, a second selection filter is tag correlation filter 242, which compares the working set of reference project manifests (e.g., reference project manifests 162 and 166) with a plurality of metadata tags associated with components 151A-156A (e.g., tags 220AD, 221AC, 222AB, 223A, 224A) to select at least one selected reference project manifest with a highest count of shared metadata tags with components 151A-156A (e.g., both reference project manifest 162 and 166 sharing 4 tags so neither is eliminated), and the working set of reference project manifests is updated with reference project manifests 162 and 166, which become the inputs into the next selection filter. In an example, as illustrated in system 201 in FIG. 2B, tag correlation filter 242 may be implemented second, after component intersection filter 240 is used to narrow down the membership of reference database 160 to include only reference project manifests with a high degree of correlated components, so that tag correlation filter 242 may identify potential alternative components (e.g., modules and libraries) to those unmatched components of application 150 (e.g., component 156A) by factoring in the tags of components in reference project manifests 162 and 166 that do not match any component in application 150 (e.g., components 157B and 158BD). In an example, if an outlier component is identified, a component from the reference stack sharing tags with the outlier component may be suggested as a substitute component to incorporate.

In an example, occupancy filter 244 may be applied to the working set resulting from applying component intersection filter 240 and/or tag correlation filter 242. In an example, occupancy filter 244 may also be applied directly to the reference database 160 where reference database 160 is of limited size, as certain implementations of occupancy filter 244 may be natural extensions of component intersection filter 240. In an example, occupancy filter 244 compares reference project manifests 162, 164, and/or 166 with an occupancy value of each respective reference project manifest, where the occupancy value is calculated based on a ratio of (i) shared components between a given reference project manifest and components 151A-156A to (ii) a count of total components in the given reference project manifest to select at least one selected reference project manifest with a highest occupancy score, and the working set of reference project manifests is updated with the one or more selected reference project manifests. For example, reference project manifest 162 includes six component references while reference project manifest 166 includes only five component references, so where both match four of application 150's components, reference project manifest 166 includes a higher ratio of matching components (e.g., a higher occupancy value) and therefore reference project manifest 166 may be selected as a reference stack for application 150.

In an example, component frequency filter 248 may be implemented as an alternative filter to tag correlation filter 242 or occupancy filter 244. In another example, component frequency filter 248 may be implemented as a selection mechanism for selecting a subset of components in a potential outlier component list 290 that includes all unmatched components between input stack (e.g., components of application 150) and reference stack (e.g., reference project manifest 166). In an example, component frequency filter 248 generates a ranking of each component represented reference database 160 by frequency of occurrence, and then filters reference project manifests 162, 164, and/or 166 based on the ranking of the components represented in each of reference project manifests 162, 164, and/or 166. In an example, the ranking of component occurrence frequencies may be pre-calculated, for example, as part of a batch update sequence for importing new reference project manifests into reference database 160. In an example, reference database 160 may only be updated periodically (e.g., monthly, quarterly, etc.) since new reference projects added to source code repositories 170 and/or 175 may require a period of time before the project quality metrics utilized by reference database 160 gather enough data on a given project to produce meaningful results. In an example, a project may be considered for inclusion in reference database 160 only after a given time has elapsed after submission. In some examples, popular projects garnering high usage statistics may bypass the waiting period for incorporation due to sufficiency of quality metric data.

In some exemplary embodiments, component intersection filter 240, then tag correlation filter 242, then occupancy filter 244, and finally component frequency filter 248 is applied to the reference project manifests in reference database 160 until only one reference project manifest remains in order to select a reference stack. In an example, any combination of filters may be applied until a match is identified. The first plurality of components identified in the input stack is compared with a second plurality of components identified in the reference stack (block 425). In the example, dependency evaluation module 140 (e.g., via potential outlier selector 246), compares the input stack of application 150 components to the reference stack of reference project manifest 166 components to identify the components in the input stack that are absent in the reference stack. In an example, a component in the input stack is selected as an outlier component based on the reference stack lacking a reference to the component (block 430). For example, components 152A' and 156A' are absent from reference project manifest 166. In an example, both components 152A' and 156A' may be selected as outlier components. In another example, a limit may be configured for how many components in a given input stack may be identified as outlier based on the total count of components in the input stack. In such examples, various potential outlier components are evaluated for a likelihood of being a true outlier, for example, based on the application of component frequency filter 248 to the potential outlier component list 290. In an example, component 156A' is selected as an identified outlier component 295. In the example, component 158D may be recommended as a potential replacement for component 156A' based on component 158D being included in the selected reference stack. In an example, a copy of component 158D may be stored in its entirety (rather than as a metadata entry in reference project manifest 166). In the example, a component repository may be associated with debugger 145 allowing for immediate incorporation and testing of the recommended replacement component 158D. In an example, the component repository stores respective copies of each component represented in the reference database 160.

Figure 5:
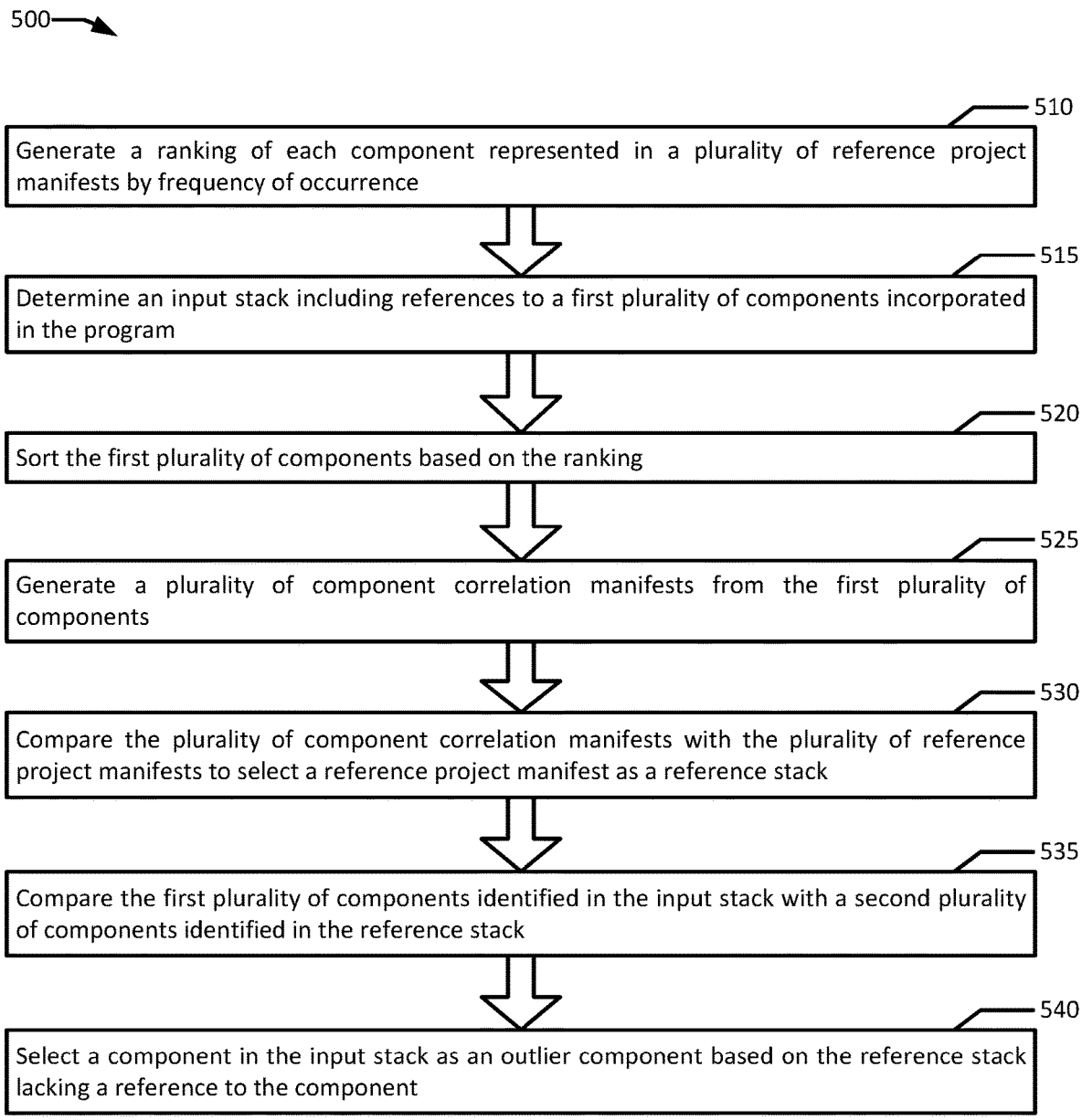
FIG. 5 is a flowchart illustrating an example of outlier software component selection and remediation according to an example of the present disclosure.

FIG. 5 is a flowchart illustrating an example of outlier software component selection and remediation according to an example of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example, the method 500 is performed by a dependency evaluation module 140.

Example method 500 may begin with generating a ranking of each component represented in a plurality of reference project manifests by frequency of occurrence (block 510). In an example, the plurality of reference project manifests is populated from a first source code repository storing a plurality of source code projects accessible over a network. For example, reference database 160 is populated from source code repositories 170 and/or 175 over network 105. In the example, reference database 160 is regularly updated from source code repositories 170 and/or 175, both for adding new reference project manifests as well as for removing deprecated reference project manifests (e.g., projects that have passed a threshold without update activity). In an example, reference projects (e.g., reference projects 181-189) in source code repositories 170 and 175 are put through selection criteria by reference database 160 prior to a subset of reference projects 181-189 being selected for inclusion in reference database 160 (e.g., as reference project manifests 162, 164, and 166). In an example, rather than storing entire software projects in reference database 160, only metadata is stored in reference database 160, for example, references (e.g., names, hash values, version numbers, etc.) to reference projects 182, 184A-B, and 186A-B in the form of reference project manifests 162, 164, and 166. In an example, rather than storing the contents of reference projects in reference database 160, components 151B, 152B, 153B, 154B, 157B, 158B, 151C, 154C, 155C, 157C, 151D, 153D, 154D, 155D, and 158D are stored as metadata references to those respective components.

An input stack that includes references to a first plurality of components incorporated in a program is determined (block 515). For example, an input stack of application 150 into dependency evaluation module is determined to be a list of references to components 151A-156A incorporated in application 150. In an example, the frequency ranking may be calculated based on the frequency of occurrence of each component in reference database 160. For example, component 151B, 151C, 151D=3 references; component 152B=1 reference; component 153B, 153D=2 references; component 154B, 154C, 154D=3 references; component 155C, 155D=2 references; component 156A=0 references; component 157B, 157C=2 references; component 158B, 158D=2 references. The first plurality of components is sorted based on the ranking (block 520). In the example, the sorted order of components 151A-156A would be 151A (e.g. 3 references), 154A (e.g. 3 references), 153A (e.g. 2 references), 155A (e.g. 2 references), 152A (e.g. 1 reference), and finally 156A (e.g. 0 references).

A plurality of component correlation manifests is generated from the first plurality of components (block 525). For example, based on the input stack of references to components 151A-156A, the combinatorics of possible matching subsets of the six components 151A-156A may be generated to be compared with reference project manifests for an a matching reference stack, with the selection criteria weighted towards matching components with higher or lower frequencies of occurrence in reference database 160. For example, each combination of two or more of components 151A-156A may be generated (e.g., 151A and 152A; 151A, 153A, and 155A; 151A, 153A, 154A, and 155A, etc.). In an example, rather than generating and testing each possible combination, a heuristic may be used, for example, where any combinations that do not include component 151A, which is the most frequently incorporated component in reference database 160 are ignored. In an example, instead of generating numerous failed matches, a selection filter may be applied first to limit the universe of potential reference stacks. For example, component intersection filter 240 may be implemented first before the plurality of component correlation manifests are generated, such that the generated component correlation manifests are all potential matches. In the example, by first applying component intersection filter 240, a list of the reference project manifests matching a highest count of components with application 150 may be identified as a working set, and then a component frequency ranking score of each member of the working set (e.g., reference project manifests 162 and 166) may be evaluated to determine a best matching reference stack for the input stack. In an example where an application being debugged has numerous components, a selection filter (e.g., component frequency filter 340) may be applied to the input stack first, to identify a subset of components in the input stack to attempt to match to a reference project manifest. For example, the highest frequency, lowest frequency, or a combination of the highest and lowest frequency components may be selected, up to a maximum count of components to avoid introducing an un-scalably high potential number of combinations for matching. In an example, combinatorics based matching may be directly performed without first applying component intersection filter 240, for example, by working in reverse starting with, for example, combinations of 2 components, and iteratively adding another component to the requested matching set until a limit is reached where no more components may be added and still yield a match. The components selected for testing matches may be selected based on frequency of occurrence.

In an example, any type of filter may be applied as an initial selection criterion before applying component frequency filter 340, including the component intersection filter 240, tag correlation filter 242, and/or occupancy filter 244 disclosed herein.

The plurality of component correlation manifests is compared with the plurality of reference project manifests to select the first reference project manifest as a reference stack (block 530). In an example, each component correlation manifest is associated with a respective correlation value. For example, each component represented in reference database 160 has a calculated frequency ranking. Based on these calculated frequency rankings, each combination of components that results in a match has a calculated weighted correlation value, with higher or lower frequency being a primary factor in determining the weighting of a matching a particular component for correlation value calculation purposes. In an example, additional factors may be considered such as size of component, number of functions in the component, and last update time of the component. In an example, a match of three highly weighted components may result in a higher correlation value than a match of four lowly weighted components. The first plurality of components identified in the input stack is compared with a second plurality of components identified in the reference stack (block 535). After one reference project manifest (e.g., reference project manifest 162) is selected as the reference stack for the input stack of the components of application 150, the input stack and reference stack are compared to identify components in the input stack missing from the reference stack. These components (e.g., components 155A' and 156A') are identified as potential outliers in a potential outlier component list 390.

A first component in the input stack is selected as an outlier component based on the reference stack lacking a reference to the first component (block 540). In an example, component 156A' is selected as an outlier component based on component 156A' being missing from reference project manifest 162. In the example, because there is no analog to component 156A' in reference database 160 at all, it has no correlation value and no frequency ranking. In such a scenario, since component 156A' is never referenced in the curated reference database 160, it is identified as an outlier component. In various scenarios, different factors may contribute towards selecting identified outlier components from potential outlier component list 390. For example, tag based selection may be implemented where a component with a high correlation value or frequency score is identified as an outlier based on being missing from the reference stack. For example, component 155A' shares tag 220C with components 151A, 154A, and 156A. Since an analogue to component 155A is missing from reference project manifest 162, even though component 155A' appears in both other reference project manifests 164 and 166, it may be identified as an outlier based on potentially being redundant in light of the other components of application 150. In an example, a maximum and/or minimum count of outlier components (e.g., outlier thresholds) may be configured to avoid an overabundance of results for applications with many components or a lack of results for applications with few components. In projects with many components (e.g., 25 components) but with a highest matched count of components being much lower (e.g., 10 components), rather than identifying 15 outliers, component frequency filter 344 may be applied to select components in the identified potential outlier component list that are more likely to be outliers than the others (e.g., based on lower frequency of use in reference database 160). A maximum outlier threshold therefore protects against over-identifying outlier modules based on an input stack having a higher than average count of integrated components or modules. Similarly, if every component in an application is matched by a reference stack, analysis may be performed to identify potentially redundant components (e.g., based on tag correlation filter 242). A minimum outlier threshold therefore protects against failing to identify any outlier modules where, for example, an input stack has a lower than average count of integrated components or modules. In some examples where every component is matched by a reference stack, additional modules from the reference stack may be recommended for inclusion. In an example, having a reference stack that matches every component in the input stack may be indicative of the source application 150 having custom, bespoke implementations of industry standard features, which may be potential security risks or inefficient code that may be more easily supported and execute more efficiently if replaced with a commonly used external library that is regularly updated. In an example, in addition to identifying outlier components, dependency evaluation module 140 may additionally recommend replacement modules based on a reference stack. For example, a substitute component with similar tags may be recommended as a replacement for an outlier component. In an example, a component repository stores each component referenced by reference database 160 to allow debugger 145 to quickly retrieve a recommended component for integration.

Figure 6:
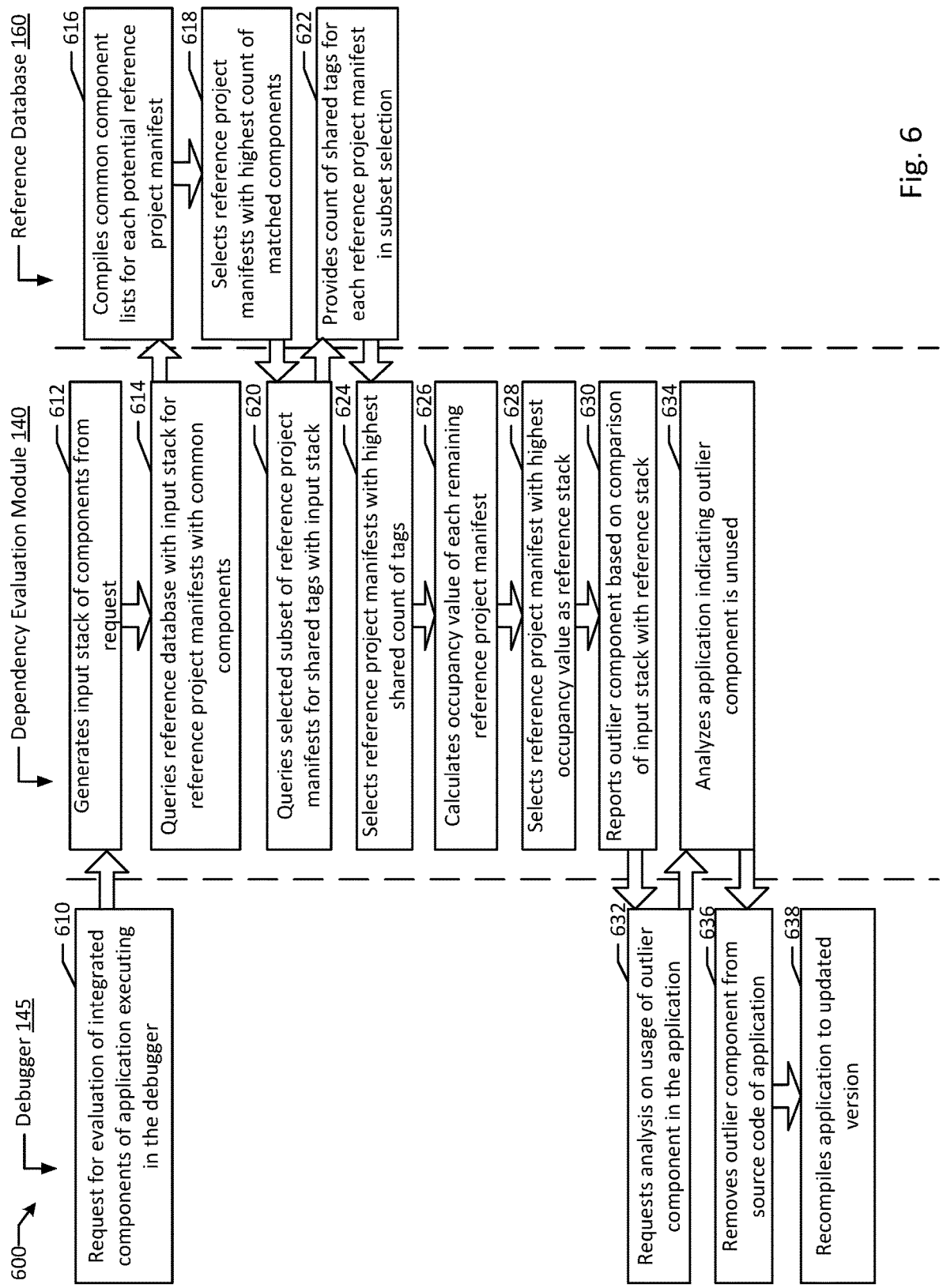
FIG. 6 is flow diagram of an example of outlier software component filtering with automated outlier remediation according to an example of the present disclosure.

FIG. 6 is flow diagram of an example of outlier software component filtering with automated outlier remediation according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, a debugger 145 requests dependency evaluation module 140 to perform outlier software component remediation with reference data stored in reference database 160 to identify and remediate outlier code.

Example method 600 may begin with debugger 145 requesting evaluation of the integrated components 151A-156A of application 150 executing in debugger 145 for potential outlier components that may require remediation (block 610). In the example, dependency evaluation module 140 generates an input stack representing the components 151A-156A of application 150 from the request (block 612). Dependency evaluation module 140 then queries reference database 160 with the components of the input stack to retrieve reference project manifests sharing common components with the input stack (block 614). In the example, reference database compiles common component lists for each potential reference stack, for example, each reference project manifest with over a certain threshold of common components with application 150 (block 616). In some examples, a reference project manifest with a lesser count of common components may be selected as a reference stack if, for example, the matched components are more significant components (e.g., larger size, more function calls) or the matched components are more closely related to the design function of application 150 (e.g., based on metadata tags or lower incorporation frequency in reference database 160). In a straight forward example such as the one illustrated in system 200 on FIG. 2A, common component lists 262, 264, and 266 are generated based on all three of reference project manifests 162, 164, and 166 being within one component match of the maximum (e.g., 4 component matches by reference project manifests 162 and 166). In the example, without further distinguishing characteristics (e.g., none of the matched components for reference project manifest 164 are unique to reference project manifest 164), reference project manifest 164 is eliminated from contention as a reference stack for application 150. In the example, reference project manifests 162 and 166 with 4 matching components each are selected as a working set based on their highest count of matched components (block 618).

In the example, dependency evaluation module 140 applies a second filter with the goal of narrowing down the potential reference stacks for application 150 down to one selection. To do so, dependency evaluation module 140 queries reference database 160 for the metadata tag information related to reference project manifests 162 and 166, to determine whether reference project manifests 162 and 166 may be distinguished based on a comparison of their metadata descriptor tags with those of components 151A-156A of application 150 (block 620). In an example, reference database 160 responds by providing a count of shared tags for each reference project manifest in the selected subset working set (e.g., reference project manifests 162 and 166) (block 622). In an example, dependency evaluation module 140 selects the reference project manifests with the highest count of shared tags (block 624). For example, as illustrated system 201 on FIG. 2B, both reference project manifests 162 and 166 have common tag lists of four tags apiece (e.g., common tag lists 272 and 276), and therefore neither is eliminated in this case by the tag correlation filter 242 as a potential reference stack for application 150. In an example, occupancy filter 244 is next applied to calculate occupancy values 284 and 288 of reference project manifests 162 and 166 (block 626). In an example, occupancy values 284 and 288 are values indicative of the ratio of matching components to total components in a given reference stack candidate (e.g., reference project manifests 162 and 166). In an example, an occupancy value may be computed based on a simple count of shared components to total components in a given reference project manifest. Occupancy values may also be calculated factoring in weighting criteria beyond counting references. For example, the size of a component, metadata tags of a component, function calls of a component (both total available function calls and invocations of those function calls within a source code project), ratings a component, last update of a component, etc. may all be factored into an occupancy value to aid in computing a functional match between a reference project manifest and application 150. In an example, occupancy calculations may be more expensive than correlation calculations in terms of time and CPU cycles, so occupancy filters factoring in more inputs may be reserved for filtering after other filters have narrowed down the choices for a reference stack to a few final candidates.

In an example, dependency evaluation module 140 selects reference project manifest 166 as a reference stack for application 150 based on reference project manifest 166 having a higher occupancy value 288 than reference project manifest 162's occupancy value 284 (block 628). In an example, dependency evaluation module 140 reports that component 156A is an outlier module based on reference project manifest 166 lacking any reference corresponding to component 156A (block 630). In some examples, component 152A may also be identified as an outlier module. In an example, component 156A may be identified as a more likely outlier than component 152A due to reference database 160 completely lacking any reference to component 156A, and therefore component 156A having a nonexistent frequency of incorporation within the reference project manifests 162, 164, and 166 of reference database 160.

Debugger 145 receives the report that component 156A is identified as an outlier component, and requests analysis on where component 156A is used in the source code of application 150 (block 632). In an example, dependency evaluation module 140 analyzes application 150 finding that component 156A is not actually functionally used by application 150 (block 634). For example, component 156A may never be invoked (e.g., no function calls are made) by application 150. In another example, component 156A may be referenced in the source code of application 150, but the reference may be in a logical branch that is deprecated (e.g., the code cannot actually go down that logical path in execution). In an example, debugger 145 removes outlier component 156A from the source code of application 150 in response to the finding that component 156A is unused (block 636). In the example, debugger 145 requests application 150 to be recompiled as an updated version without the outlier component 156A (block 638).

Figure 7:
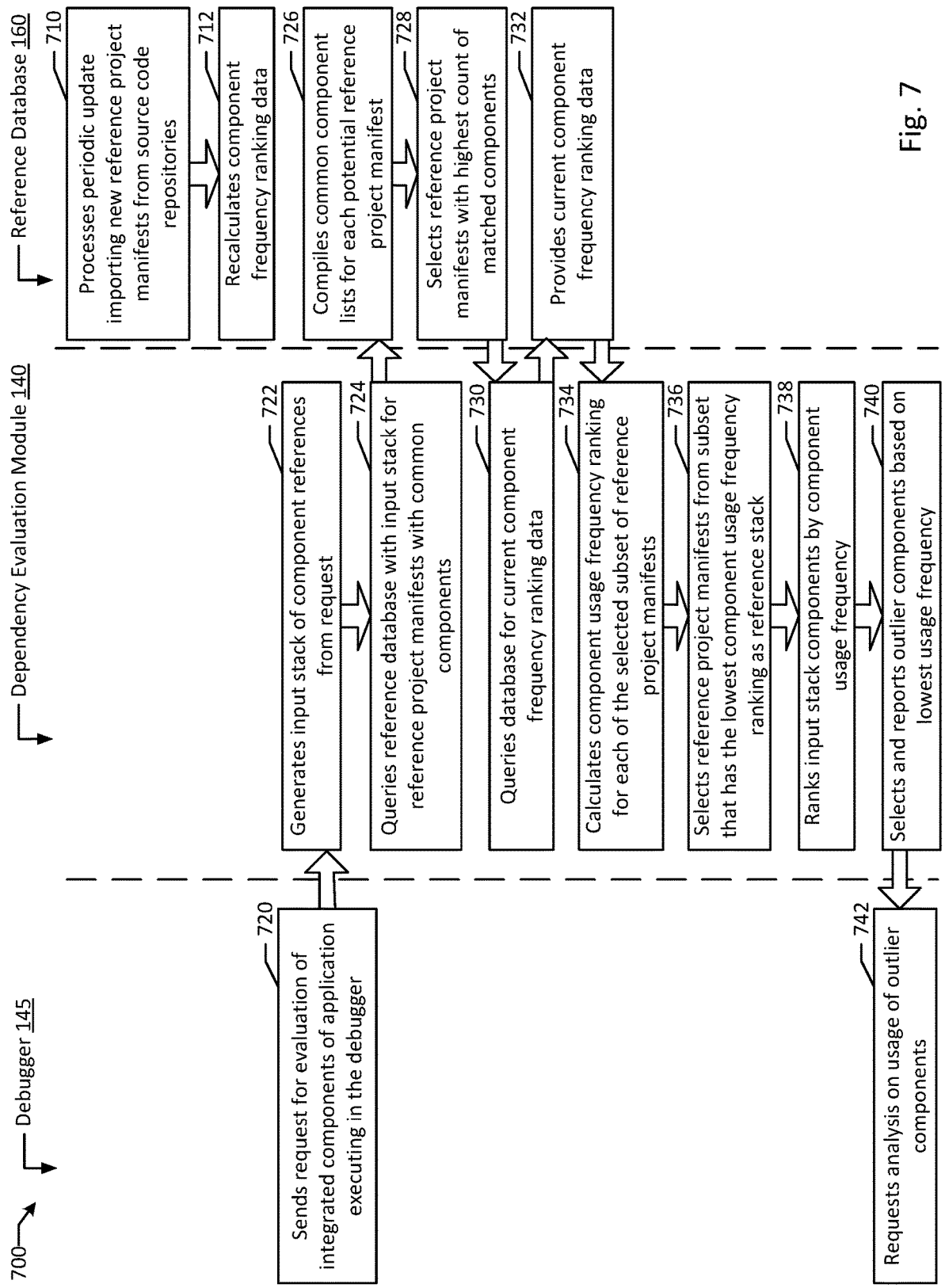
FIG. 7 is flow diagram of an example of component frequency based outlier software component selection according to an example of the present disclosure.

FIG. 7 is flow diagram of an example of component frequency based component selection outlier software component according to an example of the present disclosure. FIG. 7 is flow diagram of an example of dynamic integration of command line utilities according to an example of the present disclosure. Although the examples below are described with reference to the flowchart illustrated in FIG. 7, it will be appreciated that many other methods of performing the acts associated with FIG. 7 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 700 a debugger 145 requests dependency evaluation module 140 to perform outlier software component remediation with frequency based component selection using reference data stored in reference database 160 to identify outlier code.

Example method 700 may begin with reference database 160 executing a periodic update to import new reference project manifests from source code repository 170 (block 710). In the example, reference database 160 recalculates the rankings of all of the components in the reference project manifests stored in reference database 160 by frequency of representation after importing new reference project manifests (block 712). In various examples, updates of reference database 160 may be triggered by different circumstances. For example, a timer may be employed, or a counter for new projects in a given source code repository. In an example, different source code repositories may be on different update cycles. For example, where source code repository 170 is a public database, updates may be processed only monthly or quarterly. However, with an internal trusted database (e.g., source code repository 175 operated by the same entity as reference database 160), updates may be nightly or live.

In an example, debugger 145 executes an application 150, and sends a request for the evaluation of components 151A-156A of application 150 to dependency evaluation module 140 (block 720). In the example, dependency evaluation module 140 generates an input stack of component references from the request from debugger 145 (block 722).

Dependency evaluation module 140 then queries reference database 160 with the input stack to discover reference project manifests with common components (block 724). In an example, dependency evaluation module 140 in conjunction with reference database 160 (e.g., by way of a query) compiles a common component list (e.g., common component lists 262, 264, and 266) for each potential reference stack out of the reference project manifests 162, 164, and 166 stored in reference database 160 (block 726). In an example, reference database 160 selects reference project manifests 162 and 166 as a working set of manifests with a highest count (e.g., four) of matched components when compared with the input stack (block 728). In an example, dependency evaluation module 140 receives the common component lists 262 and 266, and subsequently queries reference database 160 for the current component frequency ranking data that was recently updated by reference database 160 (block 730). In the example, reference database 160 provides the updated component frequency ranking data (block 732).

Dependency evaluation module 140, upon receiving the component frequency ranking data, calculates a component usage frequency ranking for each of the selected common component lists 262 and 266 (block 734). In the example, dependency evaluation module 140 selects the reference project manifest from the working set that has the lowest component usage frequency ranking as a reference stack (block 736). For example, reference project manifest 162 has shares a lesser used component (e.g., component 152B) with application 150 than component 155D shared by reference project manifest 166. In the example, component 152B is more likely to be a specialized functional component relating to application 150's designed functionality than a more broadly shared component, which is more likely to be for a generic programming purpose (e.g., networking, data storage, etc.). In an example, dependency evaluation module 140 ranks the components 151A-156A of the input stack for application 150 by usage frequency (block 738). In the example, component 156A which is not used by any of the reference project manifests in reference database 160 is selected as an outlier component based on its lowest usage frequency (block 740). In the example, debugger 145 requests analysis of outlier component 156A to determine if any form of automated remediation is possible (block 742). For example, if component 156A is tagged with certain tags shared by another component, that other component may be recommended as a replacement component. If component 156A is not utilized by application 150, component 156A may be dereferenced and removed. In addition, places in the source code of application 150 that reference functions of component 156A may be highlighted and reported.

Figure 8:
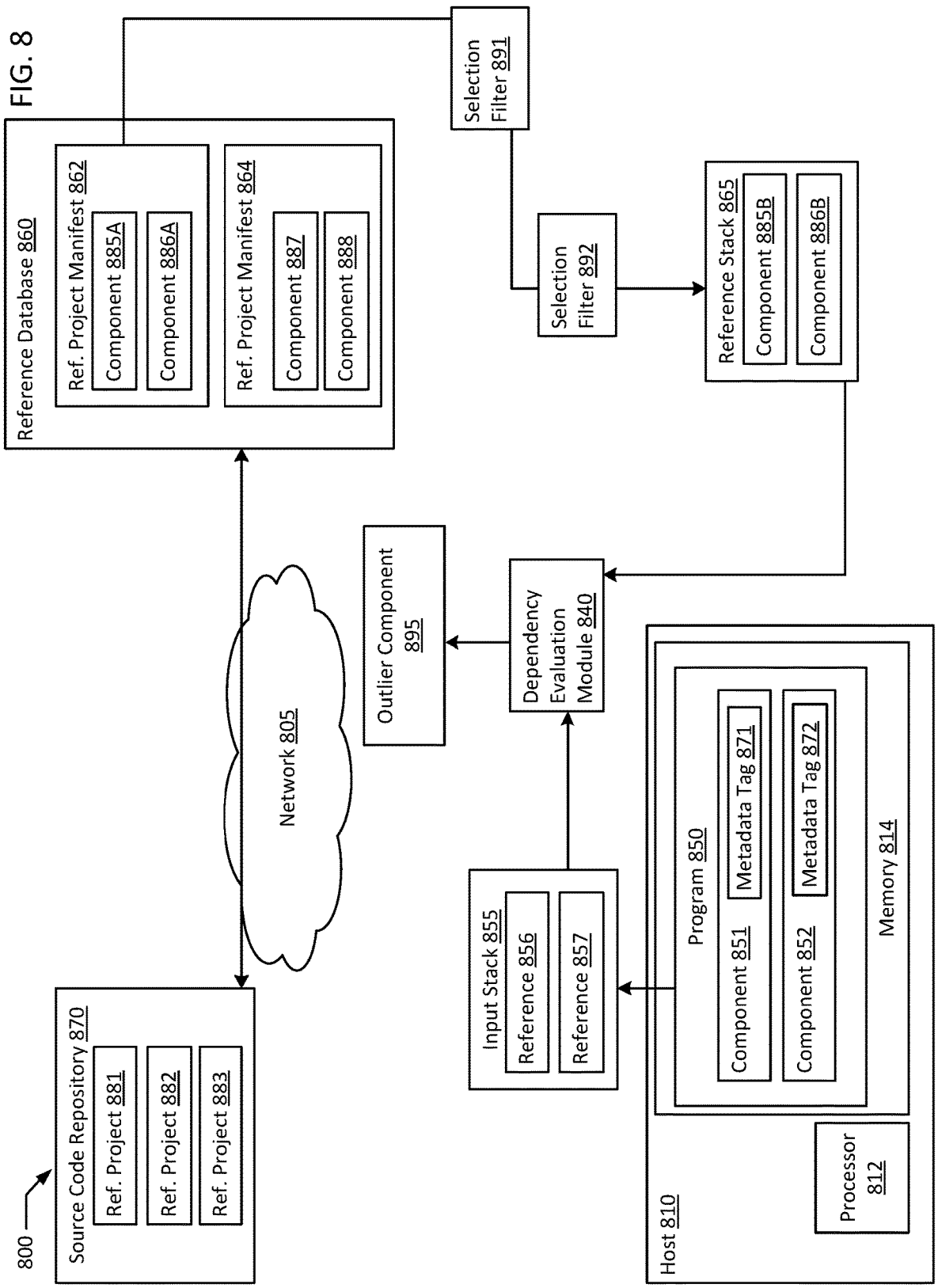
FIG. 8 is a block diagram of an example system implementing outlier software component filtering according to an example of the present disclosure.

FIG. 8 is a block diagram of an example system implementing outlier software component filtering according to an example of the present disclosure. Example system 800 includes source code repository 870 storing source code projects 881, 882, and 883, where source code repository 870 is accessible over a network 805 by reference database 860 that stores reference project manifests 851 and 852 populated from source code repository 870. Host 810 has processor 812 and memory 814 storing a program 850, with dependency evaluation module 840 executing on processor 812 to determine an input stack 855 with reference 856 to component 851 and reference 857 to component 852 respectively incorporated into program 850. Metadata tags 871 and 872 associated with components 851 and 852 are determined. Selection filters 891 and 892 are applied to reference project manifests 862 and 864 to select reference project manifest 862 as reference stack 865. Components 851 and 852 identified by reference 856 and 857 in input stack 855 are compared with components 885B and 886B identified in reference stack 865. Component 851 is selected as outlier component 895 based on reference stack 865 lacking a reference to component 851.

FIG. 9 is a block diagram of an example system implementing outlier software component selection according to an example of the present disclosure. Example system 900 includes source code repository 970 storing source code projects 981, 982, and 983, where source code repository 970 is accessible over a network 905 by reference database 960 that stores reference project manifests 951 and 952 populated from source code repository 970. Host 910 has processor 912 and memory 914 storing a program 950, with dependency evaluation module 940 executing on processor 912 to generate ranking 930 of components 995A, 996A, 997, and 998 represented in reference project manifests 962 and 964 by frequency of occurrence. An input stack 955 is determined, with reference 956 to component 951 and reference 957 to component 952 respectively incorporated into program 950. Components 951 and 952 are sorted based on ranking 930. Component correlation manifests 971 and 972 are generated from components 951 and 952. Component correlation manifests 971 and 972 are compared with reference project manifests 962 and 964 to select reference project manifest 962 as reference stack 965, where each of component correlation manifests 971 and 972 is associated with a respective correlation value (e.g., correlation value 975 and 976). Components 951 and 952 identified by reference 956 and 957 in input stack 955 are compared with components 985B and 986B identified in reference stack 965. Component 951 is selected as outlier component 995 based on reference stack 965 lacking a reference to component 951.

Outlier software component remediation enables more efficient identification and remediation of potential problem components in software projects by dynamically discovering known and trusted reference software projects that are closely related in functionality, and through comparative analysis, discovering whether a given integrated component is an outlier among other related components. Outliers exhibit behaviors that often cause maintenance, compatibility, and security issues. For example, software code that heavily employs outliers may be difficult for other software programs to integrate with due to using non-standard interfaces. In addition, outlier modules may be lacking in security and efficiency updates. Increased difficulty in integrating with external applications and decreased security often result in increased maintenance required to keep the application running, which results in increased downtime and therefore lower computing utilization. By employing outlier software component remediation as disclosed herein, computing utilization and efficiency is therefore increased while increasing the security of the computing environment.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a first source code repository storing a plurality of source code projects accessible over a network; a reference database storing a plurality of reference project manifests populated from the first source code repository, including a first reference project manifest; a host with a processor and a memory, wherein the memory stores a program; and a dependency evaluation module executing on the processor to: determine an input stack including references to a first plurality of components incorporated in the program; determine a first plurality of metadata tags associated with the first plurality of components; apply a plurality of selection filters to the plurality of reference project manifests to select the first reference project manifest as a reference stack; compare the first plurality of components identified in the input stack with a second plurality of components identified in the reference stack; and select a first component in the input stack as an outlier component based on the reference stack lacking a reference to the first component.

In accordance with a 2nd exemplary aspect of the present disclosure, which may be used in combination with any one or more of other aspects described herein (e.g., the 1st aspect), wherein a second component in the reference stack is selected as a replacement component for the first component. In accordance with a 3rd exemplary aspect of the present disclosure, which may be used in combination with any one or more of other aspects described herein (e.g., the 1st aspect), wherein a working set of reference project manifests is generated from the plurality of reference project manifests based on applying a first selection filter of the plurality of selection filters, and the working set of reference project manifests is updated after applying each subsequent selection filter of the plurality of selection filters. In accordance with a 4th exemplary aspect of the present disclosure, which may be used in combination with any one or more of other aspects described herein (e.g., the 3rd aspect), wherein a component intersection filter compares one of the plurality of reference project manifests and the working set of reference project manifests with the first plurality of components identified in the input stack to select at least one selected reference project manifest with a highest count of shared components with the first plurality of components, and the working set of reference project manifests is updated with the at least one selected reference project manifest. In accordance with a 5th exemplary aspect of the present disclosure, which may be used in combination with any one or more of other aspects described herein (e.g., the 3rd aspect), wherein a tag correlation filter compares one of the plurality of reference project manifests and the working set of reference project manifests with the first plurality of metadata tags to select at least one selected reference project manifest with a highest count of shared metadata tags with the first plurality of components, and the working set of reference project manifests is updated with the at least one selected reference project manifest. In accordance with a 6th exemplary aspect of the present disclosure, which may be used in combination with any one or more of other aspects described herein (e.g., the 3rd aspect), wherein an occupancy filter compares one of the plurality of reference project manifests and the working set of reference project manifests with an occupancy value of each respective reference project manifest, wherein the occupancy value is calculated based on a ratio of (i) shared components between a given reference project manifest and the first plurality of components to (ii) a count of total components in the given reference project manifest to select at least one selected reference project manifest with a highest occupancy score, and the working set of reference project manifests is updated with the at least one selected reference project manifest. In accordance with a 47th exemplary aspect of the present disclosure, which may be used in combination with any one or more of other aspects described herein (e.g., the 3rd aspect), wherein a component frequency filter generates a ranking of each component represented in the plurality of reference project manifests by frequency of occurrence in the plurality of reference project manifests, and filtering one of the plurality of reference project manifests and the working set of reference projects based on the ranking of the components represented in each respective reference project manifest. In accordance with an 8th exemplary aspect of the present disclosure, which may be used in combination with any one or more of other aspects described herein (e.g., the 3rd aspect), wherein applying the plurality of selection filters includes first applying a component intersection filter, then applying a tag correlation filter to a results of the component intersection filter, then applying an occupancy filter to a results of the tag correlation filter, and finally applying a component frequency filter to a results of the occupancy filter.

In accordance with a 9th exemplary aspect of the present disclosure, which may be used in combination with any one or more of other aspects described herein (e.g., the 1st aspect), wherein a maximum count of outlier components is configured based on a total count of components in the first plurality of components. In accordance with a 10th exemplary aspect of the present disclosure, which may be used in combination with any one or more of other aspects described herein (e.g., the 1st aspect), wherein the plurality of reference project manifests is populated from the first source code repository based on evaluating at least one of incorporation metrics, review metrics, code complexity metrics, supportability metrics, code quality metrics, and dead code metrics of the plurality of source code projects in the first source code repository. In accordance with an 11th exemplary aspect of the present disclosure, which may be used in combination with any one or more of other aspects described herein (e.g., the 1st aspect), wherein the plurality of reference project manifests is populated from a plurality of source code repositories including the first source code repository. In accordance with a 12th exemplary aspect of the present disclosure, which may be used in combination with any one or more of other aspects described herein (e.g., the 1st aspect), wherein a component repository stores respective copies of each component represented in the reference database.

Aspects of the subject matter described herein may be useful alone or in combination with one or more other aspects described herein. In a 13th exemplary aspect of the present disclosure, a method comprises: determining an input stack including references to a first plurality of components incorporated in a program; determining a first plurality of metadata tags associated with the first plurality of components; applying a plurality of selection filters to a plurality of reference project manifests to select a first reference project manifest of the plurality of reference project manifests as a reference stack, wherein the plurality of reference project manifests is populated from a first source code repository storing a plurality of source code projects accessible over a network; comparing the first plurality of components identified in the input stack with a second plurality of components identified in the reference stack; and selecting a first component in the input stack as an outlier component based on the reference stack lacking a reference to the first component.

Aspects of the subject matter described herein may be useful alone or in combination with one or more other aspects described herein. In a 14th exemplary aspect of the present disclosure, a system comprises: a means for determining an input stack including references to a first plurality of components incorporated in a program; a means for determining a first plurality of metadata tags associated with the first plurality of components; a means for applying a plurality of selection filters to a plurality of reference project manifests to select a first reference project manifest of the plurality of reference project manifests as a reference stack, wherein the plurality of reference project manifests is populated from a first source code repository storing a plurality of source code projects accessible over a network; a means for comparing the first plurality of components identified in the input stack with a second plurality of components identified in the reference stack; and a means for selecting a first component in the input stack as an outlier component based on the reference stack lacking a reference to the first component.

Aspects of the subject matter described herein may be useful alone or in combination with one or more other aspects described herein. In a 15th exemplary aspect of the present disclosure, a computer-readable non-transitory storage medium storing executable instructions, which when executed by a computer system, cause the computer system to: determine an input stack including references to a first plurality of components incorporated in a program; determine a first plurality of metadata tags associated with the first plurality of components; apply a plurality of selection filters to a plurality of reference project manifests to select a first reference project manifest of the plurality of reference project manifests as a reference stack, wherein the plurality of reference project manifests is populated from a first source code repository storing a plurality of source code projects accessible over a network; compare the first plurality of components identified in the input stack with a second plurality of components identified in the reference stack; and select a first component in the input stack as an outlier component based on the reference stack lacking a reference to the first component.

In accordance with a 16th exemplary aspect of the present disclosure, which may be used in combination with any one or more of other aspects described herein (e.g., the 13th, 14th, or 15th aspects), wherein a second component in the reference stack is selected as a replacement component for the first component. In accordance with a 17th exemplary aspect of the present disclosure, which may be used in combination with any one or more of other aspects described herein (e.g., the 13th, 14th, or 15th aspects), further comprises: generating a working set of reference project manifests from the plurality of reference project manifests based on applying a first selection filter of the plurality of selection filters; and updating the working set of reference project manifests after applying each subsequent selection filter of the plurality of selection filters. In accordance with an 18th exemplary aspect of the present disclosure, which may be used in combination with any one or more of other aspects described herein (e.g., the 17th aspect), wherein a component intersection filter compares one of the plurality of reference project manifests and the working set of reference project manifests with the first plurality of components identified in the input stack to select at least one selected reference project manifest with a highest count of shared components with the first plurality of components, and the working set of reference project manifests is updated with the at least one selected reference project manifest. In accordance with a 19th exemplary aspect of the present disclosure, which may be used in combination with any one or more of other aspects described herein (e.g., the 17th aspect), wherein a tag correlation filter compares one of the plurality of reference project manifests and the working set of reference project manifests with the first plurality of metadata tags to select at least one selected reference project manifest with a highest count of shared metadata tags with the first plurality of components, and the working set of reference project manifests is updated with the at least one selected reference project manifest. In accordance with a 20h exemplary aspect of the present disclosure, which may be used in combination with any one or more of other aspects described herein (e.g., the 17th aspect), wherein an occupancy filter compares one of the plurality of reference project manifests and the working set of reference project manifests with an occupancy value of each respective reference project manifest, wherein the occupancy value is calculated based on a ratio of (i) shared components between a given reference project manifest and the first plurality of components to (ii) a count of total components in the given reference project manifest to select at least one selected reference project manifest with a highest occupancy score, and the working set of reference project manifests is updated with the at least one selected reference project manifest. In accordance with a 21st exemplary aspect of the present disclosure, which may be used in combination with any one or more of other aspects described herein (e.g., the 17th aspect), wherein a component frequency filter generates a ranking of each component represented in the plurality of reference project manifests by frequency of occurrence in the plurality of reference project manifests, and filtering one of the plurality of reference project manifests and the working set of reference projects based on the ranking of the components represented in each respective reference project manifest. In accordance with a 22nd exemplary aspect of the present disclosure, which may be used in combination with any one or more of other aspects described herein (e.g., the 17th aspect), further comprises: first applying a component intersection filter; then applying a tag correlation filter to a results of the component intersection filter; then applying an occupancy filter to a results of the tag correlation filter; and finally applying a component frequency filter to a results of the occupancy filter.

In accordance with a 23rd exemplary aspect of the present disclosure, which may be used in combination with any one or more of other aspects described herein (e.g., the 13th, 14th, or 15th aspects), further comprises: configuring a maximum count of outlier components based on a total count of components in the first plurality of components. In accordance with a 24th exemplary aspect of the present disclosure, which may be used in combination with any one or more of other aspects described herein (e.g., the 13th, 14th, or 15th aspects), further comprises: populating the plurality of reference project manifests from the first source code repository based on evaluating at least one of incorporation metrics, review metrics, code complexity metrics, supportability metrics, code quality metrics, and dead code metrics of the plurality of source code projects in the first source code repository. In accordance with a 25th exemplary aspect of the present disclosure, which may be used in combination with any one or more of other aspects described herein (e.g., the 13th, 14th, or 15th aspects), further comprises: populating the plurality of reference project manifests from a plurality of source code repositories including the first source code repository. In accordance with a 26th exemplary aspect of the present disclosure, which may be used in combination with any one or more of other aspects described herein (e.g., the 13th, 14th, or 15th aspects), further comprises: storing respective copies of each component represented in the plurality of reference project manifests in a component repository.

Aspects of the subject matter described herein may be useful alone or in combination with one or more other aspects described herein. In a 27th exemplary aspect of the present disclosure, a system comprises: a first source code repository storing a plurality of source code projects accessible over a network; a reference database storing a plurality of reference project manifests populated from the first source code repository, including a first reference project manifest; a host with a processor and a memory, wherein the memory stores a program; and a dependency evaluation module executing on the processor to: generate a ranking of each component represented in the plurality of reference project manifests by frequency of occurrence; determine an input stack including references to a first plurality of components incorporated in the program; sort the first plurality of components based on the ranking; generate a plurality of component correlation manifests from the first plurality of components; compare the plurality of component correlation manifests with the plurality of reference project manifests to select the first reference project manifest as a reference stack, wherein each component correlation manifest is associated with a respective correlation value; compare the first plurality of components identified in the input stack with a second plurality of components identified in the reference stack; and select a first component in the input stack as an outlier component based on the reference stack lacking a reference to the first component.

In accordance with a 28th exemplary aspect of the present disclosure, which may be used in combination with any one or more of other aspects described herein (e.g., the 27th aspect), wherein a selection filter is applied to at least one of the first plurality of components and the plurality of reference project manifests. In accordance with a 29th exemplary aspect of the present disclosure, which may be used in combination with any one or more of other aspects described herein (e.g., the 28th aspect), wherein the selection filter is one of (i) a component intersection filter, (ii) a tag correlation filter, (iii) an occupancy filter, and (iv) a component frequency filter. In accordance with a 30th exemplary aspect of the present disclosure, which may be used in combination with any one or more of other aspects described herein (e.g., the 29th aspect), wherein the component intersection filter compares the plurality of reference project manifests with the first plurality of components identified in the input stack to select a plurality of selected reference project manifests based on respective counts of shared components with the first plurality of components. In accordance with a 31st exemplary aspect of the present disclosure, which may be used in combination with any one or more of other aspects described herein (e.g., the 29th aspect), wherein the occupancy filter calculates respective occupancy values of reference project manifests, wherein an occupancy value includes a ratio of (i) shared components between the respective reference project manifest and the first plurality of components to (ii) a count of total components in the respective reference project manifest, and wherein the occupancy filter selects at least one selected reference project manifest with a highest occupancy score. In accordance with a 32nd exemplary aspect of the present disclosure, which may be used in combination with any one or more of other aspects described herein (e.g., the 29th aspect), wherein the component frequency filter generates a ranking of each component represented in the plurality of reference project manifests by frequency of occurrence in the plurality of reference project manifests, and ranks a set of reference project manifests based on the ranking of the components represented in each respective reference project manifest of the set of reference project manifests. In accordance with a 33rd exemplary aspect of the present disclosure, which may be used in combination with any one or more of other aspects described herein (e.g., the 29th aspect), wherein the component intersection filter is applied to the plurality of reference project manifests prior to generating the plurality of component correlation manifests, each of the plurality of component correlation manifests corresponds to a subset of the first plurality of components, and each of the plurality of component correlation manifests matches at least one reference project manifest of the plurality of reference project manifests. In accordance with a 34th exemplary aspect of the present disclosure, which may be used in combination with any one or more of other aspects described herein (e.g., the 33rd aspect), wherein a respective usage frequency grade is calculated for each of the plurality of component correlation manifests, and the first reference project manifest is selected as the reference stack based on a usage frequency grade associated with a component correlation manifest corresponding to the first reference project manifest.

In accordance with a 35th exemplary aspect of the present disclosure, which may be used in combination with any one or more of other aspects described herein (e.g., the 27th aspect), wherein at least one of a maximum count of outlier components and a minimum count of outlier components is configured based on a total count of components in the first plurality of components. In accordance with a 36th exemplary aspect of the present disclosure, which may be used in combination with any one or more of other aspects described herein (e.g., the 27th aspect), wherein the plurality of reference project manifests is populated from the first source code repository based on evaluating at least one of incorporation metrics, review metrics, code complexity metrics, supportability metrics, code quality metrics, and dead code metrics of the plurality of source code projects in the first source code repository. In accordance with a 37th exemplary aspect of the present disclosure, which may be used in combination with any one or more of other aspects described herein (e.g., the 27th aspect), wherein the plurality of reference project manifests is populated from a plurality of source code repositories including the first source code repository. In accordance with a 38th exemplary aspect of the present disclosure, which may be used in combination with any one or more of other aspects described herein (e.g., the 27th aspect), wherein a component repository stores respective copies of each component represented in the reference database.

Aspects of the subject matter described herein may be useful alone or in combination with one or more other aspects described herein. In a 39th exemplary aspect of the present disclosure, a method comprises: generating a ranking of each component represented in a plurality of reference project manifests by frequency of occurrence, wherein the plurality of reference project manifests is populated from a first source code repository storing a plurality of source code projects accessible over a network; determining an input stack including references to a first plurality of components incorporated in a program; sorting the first plurality of components based on the ranking; generating a plurality of component correlation manifests from the first plurality of components; comparing the plurality of component correlation manifests with the plurality of reference project manifests to select the first reference project manifest as a reference stack, wherein each component correlation manifest is associated with a respective correlation value; comparing the first plurality of components identified in the input stack with a second plurality of components identified in the reference stack; and selecting a first component in the input stack as an outlier component based on the reference stack lacking a reference to the first component.

Aspects of the subject matter described herein may be useful alone or in combination with one or more other aspects described herein. In a 40th exemplary aspect of the present disclosure, a system comprises: a means for generating a ranking of each component represented in a plurality of reference project manifests by frequency of occurrence, wherein the plurality of reference project manifests is populated from a first source code repository storing a plurality of source code projects accessible over a network; a means for determining an input stack including references to a first plurality of components incorporated in a program; a means for sorting the first plurality of components based on the ranking; a means for generating a plurality of component correlation manifests from the first plurality of components; a means for comparing the plurality of component correlation manifests with the plurality of reference project manifests to select the first reference project manifest as a reference stack, wherein each component correlation manifest is associated with a respective correlation value; a means for comparing the first plurality of components identified in the input stack with a second plurality of components identified in the reference stack; and a means for selecting a first component in the input stack as an outlier component based on the reference stack lacking a reference to the first component.

Aspects of the subject matter described herein may be useful alone or in combination with one or more other aspects described herein. In a 41st exemplary aspect of the present disclosure, a computer-readable non-transitory storage medium storing executable instructions, which when executed by a computer system, cause the computer system to: generate a ranking of each component represented in a plurality of reference project manifests by frequency of occurrence, wherein the plurality of reference project manifests is populated from a first source code repository storing a plurality of source code projects accessible over a network; determine an input stack including references to a first plurality of components incorporated in a program; sort the first plurality of components based on the ranking; generate a plurality of component correlation manifests from the first plurality of components; compare the plurality of component correlation manifests with the plurality of reference project manifests to select the first reference project manifest as a reference stack, wherein each component correlation manifest is associated with a respective correlation value; compare the first plurality of components identified in the input stack with a second plurality of components identified in the reference stack; and select a first component in the input stack as an outlier component based on the reference stack lacking a reference to the first component.

In accordance with a 42nd exemplary aspect of the present disclosure, which may be used in combination with any one or more of other aspects described herein (e.g., the 39th, 40th, or 41st aspects), further comprises: applying a selection filter to at least one of the first plurality of components and the plurality of reference project manifests. In accordance with a 43rd exemplary aspect of the present disclosure, which may be used in combination with any one or more of other aspects described herein (e.g., the 39th, 40th, or 41st aspects), wherein the selection filter is one of (i) a component intersection filter, (ii) a tag correlation filter, (iii) an occupancy filter, and (iv) a component frequency filter. In accordance with a 44th exemplary aspect of the present disclosure, which may be used in combination with any one or more of other aspects described herein (e.g., the 43rd aspect), wherein the component intersection filter compares the plurality of reference project manifests with the first plurality of components identified in the input stack to select a plurality of selected reference project manifests based on respective counts of shared components with the first plurality of components. In accordance with a 45th exemplary aspect of the present disclosure, which may be used in combination with any one or more of other aspects described herein (e.g., the 43rd aspect), wherein the occupancy filter calculates respective occupancy values of reference project manifests, wherein an occupancy value includes a ratio of (i) shared components between the respective reference project manifest and the first plurality of components to (ii) a count of total components in the respective reference project manifest, and wherein the occupancy filter selects at least one selected reference project manifest with a highest occupancy score. In accordance with a 46th exemplary aspect of the present disclosure, which may be used in combination with any one or more of other aspects described herein (e.g., the 43rd aspect), wherein the component frequency filter generates a ranking of each component represented in the plurality of reference project manifests by frequency of occurrence in the plurality of reference project manifests, and ranks a set of reference project manifests based on the ranking of the components represented in each respective reference project manifest of the set of reference project manifests. In accordance with a 47th exemplary aspect of the present disclosure, which may be used in combination with any one or more of other aspects described herein (e.g., the 43rd aspect), further comprises: applying the component intersection filter to the plurality of reference project manifests prior to generating the plurality of component correlation manifests, wherein each of the plurality of component correlation manifests corresponds to a subset of the first plurality of components, and each of the plurality of component correlation manifests matches at least one reference project manifest of the plurality of reference project manifests. In accordance with a 48th exemplary aspect of the present disclosure, which may be used in combination with any one or more of other aspects described herein (e.g., the 43rd aspect), further comprises: calculating a respective usage frequency grade for each of the plurality of component correlation manifests; and selecting the first reference project manifest as the reference stack based on a usage frequency grade associated with a component correlation manifest corresponding to the first reference project manifest.

In accordance with a 49th exemplary aspect of the present disclosure, which may be used in combination with any one or more of other aspects described herein (e.g., the 39th, 40th, or 41st aspects), further comprises: configuring at least one of a maximum count of outlier components and a minimum count of outlier components based on a total count of components in the first plurality of components. In accordance with a 50th exemplary aspect of the present disclosure, which may be used in combination with any one or more of other aspects described herein (e.g., the 39th, 40th, or 41st aspects), further comprises: populating the plurality of reference project manifests from the first source code repository based on evaluating at least one of incorporation metrics, review metrics, code complexity metrics, supportability metrics, code quality metrics, and dead code metrics of the plurality of source code projects in the first source code repository. In accordance with a 51st exemplary aspect of the present disclosure, which may be used in combination with any one or more of other aspects described herein (e.g., the 39th, 40th, or 41st aspects), further comprises: populating the plurality of reference project manifests from a plurality of source code repositories including the first source code repository. In accordance with a 52nd exemplary aspect of the present disclosure, which may be used in combination with any one or more of other aspects described herein (e.g., the 39th, 40th, or 41st aspects), further comprises: storing respective copies of each component represented in the reference database in a component repository.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory; and
a processor in communication with the memory, wherein the processor is configured to:
generate a ranking of each component represented in a plurality of reference project manifests by frequency of occurrence;
parse a program to determine an input stack including references to a first plurality of components incorporated in the program;
sort the first plurality of components based on the ranking;
determine a first plurality of metadata tags associated with the first plurality of components;
generate a plurality of component correlation manifests from the first plurality of components;
apply a plurality of selection filters to the plurality of reference project manifests;
compare the plurality of component correlation manifests with the plurality of reference project manifests to select a first reference project manifest as a reference stack,
wherein each component correlation manifest is associated with a respective correlation value;
compare the first plurality of components identified in the input stack with a second plurality of components identified in the reference stack;
select a first component in the input stack as an outlier component based on the reference stack lacking a reference to the first component;
select a second component in the reference stack as a replacement component
replace the first component in the input stack with the second component;
recompile the program including the second component; and
execute the program.

2. The system of claim 1, wherein a working set of reference project manifests is generated from the plurality of reference project manifests based on applying a first selection filter of the plurality of selection filters, and the working set of reference project manifests is updated after applying each subsequent selection filter of the plurality of selection filters.

3. The system of claim 2, wherein a component intersection filter compares one of the plurality of reference project manifests and the working set of reference project manifests with the first plurality of components identified in the input stack to select at least one selected reference project manifest with a highest count of shared components with the first plurality of components, and the working set of reference project manifests is updated with the at least one selected reference project manifest.

4. The system of claim 2, wherein a tag correlation filter compares one of the plurality of reference project manifests and the working set of reference project manifests with the first plurality of metadata tags to select at least one selected reference project manifest with a highest count of shared metadata tags with the first plurality of components, and the working set of reference project manifests is updated with the at least one selected reference project manifest.

5. The system of claim 2, wherein an occupancy filter compares one of the plurality of reference project manifests and the working set of reference project manifests with an occupancy value of each respective reference project manifest, wherein the occupancy value is calculated based on a ratio of (i) shared components between a given reference project manifest and the first plurality of components to (ii) a count of total components in the given reference project manifest to select at least one selected reference project manifest with a highest occupancy score, and the working set of reference project manifests is updated with the at least one selected reference project manifest.

6. The system of claim 2, wherein a component frequency filter filters one of the plurality of reference project manifests and the working set of reference projects based on the ranking of the components represented in each respective reference project manifest.

7. The system of claim 2, wherein applying the plurality of selection filters includes first applying a component intersection filter, then applying a tag correlation filter to a results of the component intersection filter, then applying an occupancy filter to a results of the tag correlation filter, and finally applying a component frequency filter to a results of the occupancy filter.

8. The system of claim 1, wherein the plurality of reference project manifests is populated from a first source code repository based on evaluating at least one of incorporation metrics, review metrics, code complexity metrics, supportability metrics, code quality metrics, and dead code metrics of the plurality of source code projects in the first source code repository.

9. The system of claim 1, wherein the plurality of reference project manifests is populated from a plurality of source code repositories over a network.

10. The system of claim 1, wherein a component repository stores respective copies of each component represented in a reference database that stores the plurality of reference project manifests.

11. A method comprising:
generating a ranking of each component represented in a plurality of reference project manifests by frequency of occurrence;
parsing a program to determining an input stack including references to a first plurality of components incorporated in the program;
sorting the first plurality of components based on the ranking;
determining a first plurality of metadata tags associated with the first plurality of components;
generating a plurality of component correlation manifests from the first plurality of components;
applying a plurality of selection filters to the plurality of reference project manifests;
comparing the plurality of component correlation manifests with the plurality of reference project manifests to select a first reference project manifest of the plurality of reference project manifests as a reference stack, wherein the plurality of reference project manifests is populated from a first source code repository storing a plurality of source code projects accessible over a network, wherein each component correlation manifest is associated with a respective correlation value;
comparing the first plurality of components identified in the input stack with a second plurality of components identified in the reference stack;
selecting a first component in the input stack as an outlier component based on the reference stack lacking a reference to the first component;
selecting a second component in the reference stack as a replacement component
replacing the first component in the input stack with the second component;
recompiling the program including the second component; and
executing the program.

12. A system comprising:
a first source code repository storing a plurality of source code projects accessible over a network;
a reference database storing a plurality of reference project manifests populated from the first source code repository, including a first reference project manifest;
a host with a processor and a memory, wherein the memory stores a program; and
a dependency evaluation module executing on the processor to:

generate a ranking of each component represented in the plurality of reference project manifests by frequency of occurrence;
parsing the program to determine an input stack including references to a first plurality of components incorporated in the program;
sort the first plurality of components based on the ranking;
generate a plurality of component correlation manifests from the first plurality of components;
compare the plurality of component correlation manifests with the plurality of reference project manifests to select the first reference project manifest as a reference stack, wherein each component correlation manifest is associated with a respective correlation value;
compare the first plurality of components identified in the input stack with a second plurality of components identified in the reference stack;
select a first component in the input stack as an outlier component based on the reference stack lacking a reference to the first component;
select a second component in the reference stack as a replacement component
replace the first component in the input stack with the second component;
recompile the program including the second component; and
execute the program.

13. The system of claim 12, wherein a selection filter is applied to at least one of the first plurality of components and the plurality of reference project manifests, and the selection filter is one of (i) a component intersection filter, (ii) a tag correlation filter, (iii) an occupancy filter, and (iv) a component frequency filter.

14. The system of claim 13, wherein the component intersection filter compares the plurality of reference project manifests with the first plurality of components identified in the input stack to select a plurality of selected reference project manifests based on respective counts of shared components with the first plurality of components.

15. The system of claim 13, wherein the occupancy filter calculates respective occupancy values of reference project manifests, wherein an occupancy value includes a ratio of (i) shared components between the respective reference project manifest and the first plurality of components to (ii) a count of total components in the respective reference project manifest, and wherein the occupancy filter selects at least one selected reference project manifest with a highest occupancy score.

16. The system of claim 13, wherein the component frequency filter generates a ranking of each component represented in the plurality of reference project manifests by frequency of occurrence in the plurality of reference project manifests, and ranks a set of reference project manifests based on the ranking of the components represented in each respective reference project manifest of the set of reference project manifests.

17. The system of claim 13, wherein the component intersection filter is applied to the plurality of reference project manifests prior to generating the plurality of component correlation manifests, each of the plurality of component correlation manifests corresponds to a subset of the first plurality of components, and each of the plurality of component correlation manifests matches at least one reference project manifest of the plurality of reference project manifests, and
wherein a respective usage frequency grade is calculated for each of the plurality of component correlation manifests, and the first reference project manifest is selected as the reference stack based on a usage frequency grade associated with a component correlation manifest corresponding to the first reference project manifest.

18. The system of claim 12, wherein at least one of a maximum count of outlier components and a minimum count of outlier components is configured based on a total count of components in the first plurality of components.

19. The system of claim 12, wherein the plurality of reference project manifests is populated from the first source code repository based on evaluating at least one of incorporation metrics, review metrics, code complexity metrics, supportability metrics, code quality metrics, and dead code metrics of the plurality of source code projects in the first source code repository.

* * * * *

UNITED STATES PATENT AND TRADEMARK OFFICE
CERTIFICATE OF CORRECTION

PATENT NO. : 11,093,241 B2
APPLICATION NO. : 16/152946
DATED : August 17, 2021
INVENTOR(S) : Shah et al.

Page 1 of 1

It is certified that error appears in the above-identified patent and that said Letters Patent is hereby corrected as shown below:

In the Specification

In Column 5, Line 22, replace "("VIVID")" with -- ("VMD") --.

In the Claims

In Column 32, Line 18 (Claim 1), replace "component" with -- component; --.

In Column 33, Line 52 (Claim 11), replace "component" with -- component; --.

In Column 34, Line 22 (Claim 12), replace "component" with -- component; --.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*